(12) United States Patent
He et al.

(10) Patent No.: US 8,647,740 B2
(45) Date of Patent: Feb. 11, 2014

(54) HEAT-TRANSFER LABEL WELL-SUITED FOR LABELING FABRICS AND METHODS OF MAKING AND USING THE SAME

(75) Inventors: Xiao-Ming He, Arcadia, CA (US); Liviu Dinescu, Chatsworth, CA (US); Kuolih Tsai, Arcadia, CA (US); Dong-Tsai Hseih, Arcadia, CA (US); Li Shu, Arcadia, CA (US); Yi-Hung Chiao, Temple City, CA (US); Alan Morgenthau, Keene, NH (US); Ramin Heydarpour, Beverly Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 628 days.

(21) Appl. No.: 11/827,394

(22) Filed: Jul. 11, 2007

(65) Prior Publication Data

US 2007/0275319 A1  Nov. 29, 2007

Related U.S. Application Data

(63) Continuation of application No. 10/903,472, filed on Jul. 30, 2004, now abandoned, which is a continuation-in-part of application No. PCT/US03/38315, filed on Dec. 2, 2003.

(60) Provisional application No. 60/430,216, filed on Dec. 2, 2002, provisional application No. 60/453,661, filed on Mar. 11, 2003.

(51) Int. Cl.
*B41M 5/40* (2006.01)

(52) U.S. Cl.
USPC ....... 428/346; 428/32.6; 428/32.83; 428/352; 428/354; 430/203

(58) Field of Classification Search
USPC .............. 428/32.39, 32.52, 32.6, 32.75
See application file for complete search history.

(56) References Cited

U.S. PATENT DOCUMENTS 3,359,127 A  12/1967  Meyer et al.
3,657,832 A   4/1972  Valentine
(Continued)

FOREIGN PATENT DOCUMENTS

EP  0372585 A2 *  6/1990  .............. B41M 5/38
EP  0 831 999 B1   4/2001
(Continued)

OTHER PUBLICATIONS

Le, "Progress and Trends in Ink-jet Printing Technology," Journal of Imaging Science and Technology, 42:49-62 (19998).

(Continued)

*Primary Examiner* — Callie Shosho
*Assistant Examiner* — Cheng Huang
(74) *Attorney, Agent, or Firm* — Kriegsman & Kriegsman

(57) ABSTRACT

A method for labeling fabrics, such as fabric garments, and a heat-transfer label well-suited for use in said method. In one embodiment, the heat-transfer label comprises (i) a support portion, the support portion comprising a carrier and a release layer; (ii) a wax layer, the wax layer overcoating the release layer; and (iii) a transfer portion, the transfer portion comprising an adhesive layer printed onto the wax layer and an ink design layer printed onto the adhesive layer. Preferably, at least a portion of the ink design layer is printed using a variable printing technique, such as thermal transfer printing.

24 Claims, 5 Drawing Sheets

(56) References Cited

U.S. PATENT DOCUMENTS

| | | | |
|---|---|---|---|
| 3,660,212 A | | 5/1972 | Liebe, Jr. |
| 3,793,112 A | | 2/1974 | Sontag et al. |
| RE28,542 E | | 9/1975 | Meyer |
| 3,920,499 A | | 11/1975 | Day et al. |
| 3,959,555 A | | 5/1976 | Day et al. |
| 3,992,559 A | | 11/1976 | Day et al. |
| 4,022,926 A | * | 5/1977 | Keough et al. ............... 428/42.2 |
| 4,078,113 A | | 3/1978 | Starbuck et al. |
| 4,256,795 A | | 3/1981 | Day et al. |
| 4,544,590 A | | 10/1985 | Egan |
| 4,786,349 A | | 11/1988 | Mahn, Sr. |
| 4,875,961 A | * | 10/1989 | Oike et al. .................... 156/234 |
| 4,880,686 A | * | 11/1989 | Yaegashi et al. ............ 428/32.75 |
| 5,073,452 A | * | 12/1991 | Satou et al. ................... 428/349 |
| 5,074,595 A | | 12/1991 | Hill et al. |
| 5,161,829 A | | 11/1992 | Detrick et al. |
| 5,383,959 A | * | 1/1995 | Sirdesai et al. ............ 106/31.21 |
| 5,411,783 A | | 5/1995 | Mahn, Jr. |
| 5,456,969 A | | 10/1995 | Suzuki et al. |
| 5,538,831 A | | 7/1996 | Oshima et al. |
| 5,583,489 A | | 12/1996 | Loemker et al. |
| 5,658,647 A | | 8/1997 | Magill et al. |
| 5,662,758 A | | 9/1997 | Hamilton et al. |
| 5,788,796 A | | 8/1998 | Look et al. |
| 5,800,890 A | | 9/1998 | Myers |
| 5,813,772 A | | 9/1998 | Magill et al. |
| 5,832,827 A | | 11/1998 | Pistro et al. |
| 5,908,694 A | | 6/1999 | Makar et al. |
| 5,935,694 A | * | 8/1999 | Olmstead et al. .......... 428/32.69 |
| 6,147,604 A | | 11/2000 | Wiklof et al. |
| 6,152,621 A | | 11/2000 | Langan |
| 6,250,316 B1 | * | 6/2001 | Brandt et al. .................... 134/26 |
| 6,254,970 B1 | | 7/2001 | Hiatt et al. |
| 6,309,498 B1 | | 10/2001 | Doi |
| 6,376,069 B1 | | 4/2002 | Bilodeau et al. |
| 6,383,710 B2 | | 5/2002 | Hare et al. |
| 6,395,373 B2 | | 5/2002 | Conti et al. |
| 6,423,466 B2 | | 7/2002 | Hare et al. |
| 6,521,327 B1 | | 2/2003 | Franke |
| 6,797,747 B1 | | 9/2004 | Patel et al. |
| 6,893,717 B1 | | 5/2005 | Tsai et al. |
| 7,102,657 B2 | | 9/2006 | Chamandy |
| 7,151,552 B2 | | 12/2006 | Chamandy |
| 2001/0005543 A1 | | 6/2001 | Haneda et al. |
| 2002/0109636 A1 | | 8/2002 | Johnson et al. |
| 2002/0136866 A1 | | 9/2002 | Geurtsen et al. |
| 2003/0044595 A1 | | 3/2003 | Christian et al. |
| 2003/0063139 A1 | | 4/2003 | Hohberger et al. |
| 2003/0136503 A1 | | 7/2003 | Green et al. |
| 2003/0203193 A1 | * | 10/2003 | Murata et al. ................. 428/343 |
| 2004/0179083 A1 | | 9/2004 | Chamandy |
| 2007/0009732 A1 | | 1/2007 | Tsai et al. |

FOREIGN PATENT DOCUMENTS

| | | |
|---|---|---|
| EP | 0 844 097 B1 | 7/2001 |
| EP | 1 225 062 A2 | 7/2002 |
| EP | 0 947 967 B1 | 11/2003 |
| EP | 1 388 827 A2 | 2/2004 |
| EP | 1 457 351 A1 | 9/2004 |
| JP | S56-167490 | 12/1981 |
| JP | H05-246197 | 9/1993 |
| JP | H07-299996 | 11/1995 |
| JP | H08-092566 | 7/1996 |
| JP | 1997122605 A | 5/1997 |
| JP | 1997297536 A | 11/1997 |
| JP | 2000284694 | 10/2000 |
| JP | 2002347362 | 12/2002 |
| JP | 2003063158 A | 3/2003 |
| WO | WO 95/31800 A1 | 11/1995 |
| WO | WO 96/08596 A1 | 3/1996 |
| WO | WO 96/40508 A1 | 12/1996 |
| WO | WO 96/40526 A1 | 12/1996 |
| WO | WO 98/03724 A1 | 1/1998 |
| WO | WO 01/00401 A1 | 1/2001 |
| WO | WO 01/03950 A1 | 1/2001 |
| WO | WO 01/12447 A1 | 2/2001 |
| WO | WO 03/029005 A2 | 4/2003 |
| WO | WO 2004/050262 A1 | 6/2004 |
| WO | WO 2005/068174 A1 | 7/2005 |

OTHER PUBLICATIONS

Printout of www.gotagless.com, Jan. 5, 2005.

* cited by examiner

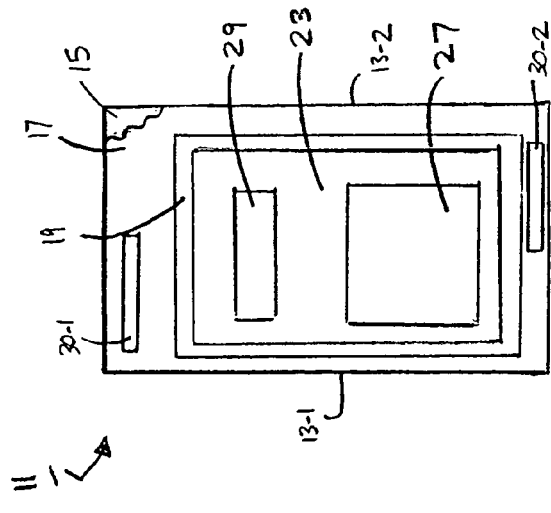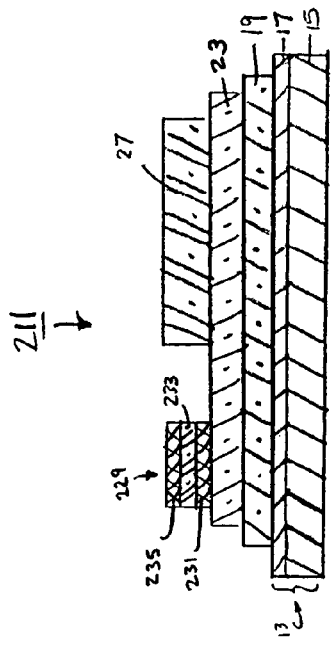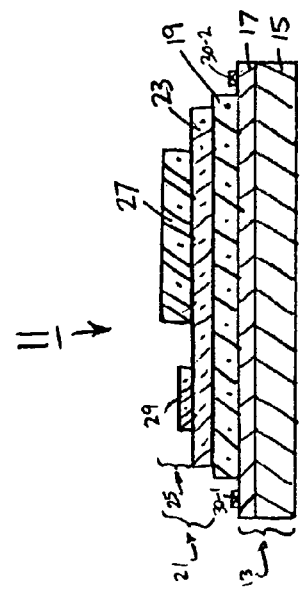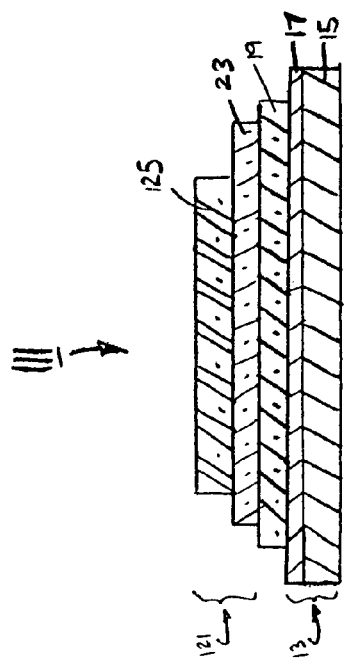

HEAT-TRANSFER LABEL WELL-SUITED FOR LABELING FABRICS AND METHODS OF MAKING AND USING THE SAME

CROSS-REFERENCE TO RELATED APPLICATIONS

The present application is a continuation of presently-pending U.S. patent application Ser. No. 10/903,472, filed Jul. 30, 2004, now abandoned which, in turn, is a continuation-in-part of International Application No. PCT/US03/38315, with an international filing date of Dec. 2, 2003, which, in turn, claims the benefit under 35 U.S.C. 119(e) of U.S. Provisional Patent Application Ser. No. 60/430,216, filed Dec. 2, 2002, and U.S. Provisional Patent Application Ser. No. 60/453,661, filed Mar. 11, 2003. All of the foregoing applications are incorporated herein by reference.

BACKGROUND OF THE INVENTION

The present invention relates generally to heat-transfer labels and relates more particularly to heat-transfer labels well-suited for labeling fabrics.

It is customary for manufacturers of garments and other finished fabrics (e.g., towels, bed linens, tablecloths, etc.) to attach thereto one or more labels that display various items of information, such as article size, fiber content, instructions for care, and the manufacturer's name or trademark. Such labels, which are to be contrasted with hanging price tags and the like, are typically not intended to be removed by the consumer after the purchase of the article, but rather, are intended to be permanently affixed to the article. In fact, such labels are commonly known in the industry as permanent care labels and typically comprise a small piece of cloth which is sewn directly onto the article, said small piece of cloth bearing the information described above.

Unfortunately, the presence of a permanent care label on certain articles, such as undergarments or other garments in which the label is in direct contact with the wearer's skin, can become irritating to the wearer. As a result, it is not uncommon for a wearer of such a garment to remove the permanent care label, typically by cutting or simply by ripping the permanent care label from the garment. However, as can readily be appreciated, such a practice not only results in a loss of the information contained on the label but the act of cutting or ripping the permanent care label from the garment can also result in significant damage to the garment, itself.

One approach to this problem has been to replace the aforementioned permanent care cloth label sewn onto the garment with a heat-transfer label applied to the garment. One such type of heat-transfer label construction comprises (a) a support portion, said support portion including (i) a polyester film carrier having a thickness of about 4 mil; and (ii) a polyacrylate/ester/silicone release of about 3 microns applied to the top of said carrier; and (b) a transfer portion, said transfer portion including (i) a protective layer, said protective layer being positioned directly on top of the release layer and having a thickness of about 3.5 microns; (ii) one or more ink layers positioned on top of the protective layer and having a thickness of about 5-9 microns; and (iii) a heat-activatable polyester/ester/silicone adhesive layer, said adhesive layer being positioned on top of the one or more ink layers and having a thickness of about 2 mil and a melting temperature of about 102-113° C. Typically, the support portion is in the form of an elongated web, with a plurality of discrete transfer portions being spaced thereover. In use, the garment to be labeled is set on a mandrel, and the heat-transfer label construction is inverted so that the adhesive layer of one of its transfer portions is positioned over the garment. A heated press is then brought down on top of the support portion to press the adhesive layer of the transfer portion against the garment and to heat the label construction through the support portion. The heating of the construction causes the activation of the adhesive layer against the garment. The heated press is then removed from the support portion, and the heated construction is allowed to cool on the garment. Once the heated construction has cooled sufficiently, the support portion is peeled away from the transfer portion, resulting in a labeled garment. The label construction may then be advanced so that another transfer portion is aligned with the mandrel, and the process may then be repeated for another garment.

One problem with the heat-transfer label described above is that the transfer portion, once applied to a garment, must be allowed to cool prior to the peeling away of the support portion therefrom. If such a period of time is not provided to permit the heated transfer portion to cool, the release of the transfer portion from the support portion will not be clean, and the transfer portion will not transfer completely to the garment. This is problematic because the cooling step, which can have a duration in the range of several seconds up to one or more minutes, adds time to the labeling process, thereby limiting the throughput of the process.

Another problem with the heat-transfer label described above is that, once the transfer portion of the heat-transfer label has been printed, the particular array of information displayed by the label is fixed and cannot thereafter be altered or supplemented. As can readily be appreciated, where a garment labeler (e.g. garment manufacturer, garment distributor, etc.) needs to label more than one type and/or size of garment, such an absence of flexibility in label content is undesirable since it requires the garment labeler to have on-hand pre-printed labels of every possible type in sufficient quantity to label every article with an appropriate label. Such a requirement for labels of every type in sufficient quantity often results in the undesirable purchase and storage of more labels than are actually used. Clearly, it would be desirable to have labels that are customizable in content, preferably printed with variable information by the garment labeler, so that such labels may be printed as needed.

Documents relating to the labeling of garments using heat-transfer technology include the following U.S. patents: U.S. Pat. No. 6,423,466, inventors Hare et al., which issued Jul. 23, 2002; U.S. Pat. No. 6,383,710, inventors Hare et al., which issued May 7, 2002; U.S. Pat. No. 5,813,772, inventors Magill et al., which issued Sep. 29, 1998; U.S. Pat. No. 5,411,783, inventor Mahn, Jr., which issued May 2, 1995; U.S. Pat. No. 4,786,349, inventor Mahn, Sr., which issued Nov. 22, 1988; U.S. Pat. No. 4,256,795, inventors Day et al., which issued Mar. 17, 1981; U.S. Pat. No. 3,992,559, inventors Day et al., which issued Nov. 16, 1976; U.S. Pat. No. 3,959,555, inventors Day et al., which issued May 25, 1976; U.S. Pat. No. 3,920,499, inventors Day et al., which issued Nov. 18, 1975; and U.S. Reissue Pat. No. 28,542, inventor Meyer, which reissued Sep. 2, 1975.

SUMMARY OF THE INVENTION

It is an object of the present invention to provide a new heat-transfer label.

It is another object of the present invention to provide a new heat-transfer label that is well-suited for labeling articles, such as, but not limited to, fabric garments.

It is another object of the present invention to provide a heat-transfer label as described above that overcomes at least some of the shortcomings discussed above in connection with existing heat-transfer labels.

In furtherance of the above and other objects to be set forth or to become apparent from the description to follow, and according to one aspect of the invention, there is provided a heat-transfer label well-suited for labeling an article of fabric, the heat-transfer label comprising (a) a support portion; and (b) a transfer portion, the transfer portion being positioned over the support portion for transfer of the transfer portion from the support portion to an article of fabric, the transfer portion comprising (i) a first printed marking, and (ii) a heat-activatable adhesive layer, the heat-activatable adhesive layer having a surface roughness not exceeding about 15 microns, preferably 10 microns; (iii) wherein the first printed marking and the heat-activatable adhesive layer are positioned relative to one another so that one of the first printed marking and the heat-activatable adhesive layer is positioned over the other.

According to another aspect of the invention, there is provided heat-transfer label well-suited for labeling an article of fabric, the heat-transfer label comprising (a) a support portion; and (b) a transfer portion, the transfer portion being positioned over the support portion for transfer of the transfer portion from the support portion to an article of fabric, the transfer portion comprising (i) a heat-activatable adhesive layer, the heat-activatable adhesive layer having a surface roughness not exceeding about 15 microns; and (ii) a design layer positioned directly over the heat-activatable adhesive layer, the design layer being printed entirely by a variable printing technique.

According to yet another aspect of the invention, there is provided heat-transfer label well-suited for labeling an article of fabric, the heat-transfer label comprising (a) a carrier; (b) a release layer, the release layer being positioned over the carrier; and (c) a first marking transferable to the article of fabric, the first marking being positioned over the release layer, the first marking being made by thermal transfer printing and comprising a first ink layer and a first ink diffusion barrier layer, one of the first ink layer and the first ink diffusion barrier layer being positioned over the other.

According to still yet another aspect of the invention, there is provided a method of labeling an article using a heat-transfer label, such a method comprising the steps of (a) providing a heat-transfer label, the heat-transfer label comprising (i) a carrier, and (ii) a release material, the release material being positioned over the carrier; (b) then, forming a first marking over the release material, the first marking being made by thermal transfer printing; and (c) then, directly contacting the first marking with a garment and transferring the first marking from the carrier to the garment under conditions of heat and pressure.

According to a further aspect of the invention, there is provided a method of making a heat-transfer label, such a method comprising the steps of (a) providing a releasable support; (b) printing a heat-activatable adhesive layer over the releasable support, the heat-activatable adhesive having a surface roughness not exceeding about 15 microns; and (c) printing a design layer directly onto the heat-activatable adhesive layer.

According to yet a further aspect of the invention, there is provided a method of making a heat-transfer label, such a method comprising the steps of (a) providing a releasable support; (b) then, printing a design layer over the releasable support; (c) then, printing a heat-activatable adhesive layer over the ink design layer; and (d) then, printing a marking directly onto the heat-activatable adhesive layer.

According to still yet a further aspect of the invention, there is provided a thermal transfer printing ribbon, such a thermal transfer printing ribbon comprising (a) a carrier; (b) a wax release layer over the carrier; (c) a first ink diffusion barrier layer over the wax release layer; (d) a first ink layer over the first ink diffusion barrier layer; and (e) a second ink diffusion barrier layer over the first ink layer.

According to still yet a further aspect of the invention, there is provided a thermal transfer printing ribbon, the thermal transfer printing ribbon comprising (a) a releasable support; (b) a first ink layer positioned over the releasable support; (c) a first ink diffusion barrier layer positioned over the releasable support, one of the first ink layer and the first ink diffusion barrier layer being positioned over the other; and (d) a heat-activatable adhesive layer positioned over the higher positioned of the first ink layer and the first ink diffusion barrier layer.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labeled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIG. 1(a) is a schematic section view of a first embodiment of a heat-transfer label well-suited for use in labeling articles of fabric;

FIG. 1(b) is a top view, broken away in part, of the heat-transfer label of FIG. 1(a);

FIG. 3 is a schematic section view of a second embodiment of a heat-transfer label well-suited for use in labeling articles of fabric;

FIG. 4 is a schematic section view of a third embodiment of a heat-transfer label well-suited for use in labeling articles of fabric;

DETAILED DESCRIPTION OF PREFERRED EMBODIMENTS

Figure 13:
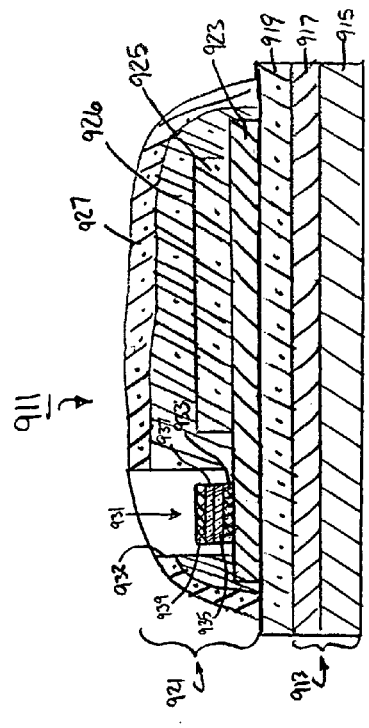
FIG. 13 is a schematic section view of a tenth embodiment of a heat-transfer label well-suited for use in labeling articles of fabric.

Referring now to FIGS. 1(a) and 1(b), there are shown schematic section and top views, respectively, of a first embodiment of a heat-transfer label well-suited for use in labeling articles of fabric, said heat-transfer label being constructed according to the teachings of the present invention and being represented generally by reference numeral 11.

Label 11 comprises a support portion 13. Support portion 13, in turn, comprises a carrier 15. Carrier 15 may be a paper substrate, a polymer-coated paper substrate, or a polymer film substrate. Preferably, carrier 15 is a polymer film substrate having a glass transition temperature in the range of 60° C. to 250° C. and having a storage modulus in the range of $1.0 \times 10^{10}$ dynes/cm$^2$ to $2.0 \times 10^{10}$ dynes/cm$^2$ at ambient temperature and a storage modulus in the range of $5.0 \times 10^7$ to $1.5 \times 10^{10}$ dynes/cm$^2$ at 100° C. Examples of materials particularly preferred for use as carrier 15 include polyester films, particularly polyethylene terephthalate (PET) films and poly(ethylene 2,6-naphthalene dicarboxylate) (PEN) films, and oriented polypropylene films, particularly heat-stabilized, oriented polypropylene films. This is because, at least as compared to some other plastic materials like polyethylene and non-oriented polypropylene, polyester has better mechanical properties and makes a better substrate to be printed onto. In addition, unlike polyethylene, polyester does not tend to soften and become tacky at the types of temperatures typically encountered during heat-transfer.

More preferably, carrier 15 is a plastic film of the type described above that is additionally optically clear. As can readily be appreciated, one benefit to using a clear material as carrier 15 is that, if desired, one can inspect the quality of the printed matter of the label by looking at said printed matter through carrier 15 (from which perspective said printed matter appears as it will on the labelled article), as opposed to looking at said printed matter through the adhesive layer of the label (from which perspective said printed matter appears as the mirror image of what will appear on the labeled article).

Carrier 15 preferably has a thickness of about 0.5-7 mil, more preferably about 0.9-3.0 mil, even more preferably about 1.4-2 mil.

Support portion 13 also includes a release layer or coating 17, coating 17 preferably being applied directly to the top of carrier 15. Coating 17 is a release material that preferably separates cleanly from the below-described transfer portion of label 11 and is not transferred, to any visually discernible degree, with said transfer portion of label 11 onto an article being labeled. (For purposes of the present specification and claims, the term "visually discernible" is to be construed in terms of an unaided or naked human eye.) Moreover, in addition to separating cleanly from the transfer portion of label 11, coating 17 preferably permits the separation of the transfer portion of label 11 from coating 17 soon (i.e., within a few seconds) after said transfer portion has been applied to an article of fabric. Preferably, release coating 17 is clear for the same types of reasons given above in connection with carrier 15.

Coating 17 preferably has a thickness of about 0.01 to 10 microns, more preferably about 0.02 to 1 micron, even more preferably about 0.1 micron.

Preferably, coating 17 and carrier 15 are selected so that the release force required to peel a unit width of pressure sensitive tape from coating 17 at 180 degrees is in the range of about 0.5-5.0 lb/inch, more preferably about 1.5-3.5 lb/inch, even more preferably about 2.1-2.4 lb/inch. For purposes of the present specification and claims, the release force required to peel a unit width of pressure sensitive tape from coating 17 at 180 degrees is determined in accordance with Adhesion Test Method PSTC-4B, which is described in *Test Methods for Pressure Sensitive Adhesive Tapes*, 13$^{th}$ Edition, published by Pressure Sensitive Tape Council, Northbrook, Ill. (2000), and which is incorporated herein by reference.

A variety of different substances may be applied to carrier 15 to form coating 17. One such substance is an olefinic material that does not contain any waxes or any silicones, except to the limited extent provided below. (The terms "non-wax" and "non-silicone," when used in the present specification and claims to describe or to define a release layer or coating formed from such a substance, are defined herein to exclude from said release layer or coating the presence of any and all waxes and silicones not encompassed by the limited exceptions provided below.) The coating formed from said olefinic substance has a total surface energy of about 25 to 35 mN/m (preferably about 30 mN/m), of which about 0.1 to 4 mN/m (preferably about 1.3 mN/m) is polar surface energy. When analyzed by XPS (X-ray photoelectron spectroscopy), said coating has a carbon content (by atomic %) of about 90 to 99.9% (preferably about 97%) and an oxygen content (by atomic %) of about 0.1 to 10% (preferably about 3%). Examples of a support portion 13 that includes a carrier 15 and a coating 17 as described above are commercially available from DuPont Teijin Films (Hopewell, Va.) as Mylar® A701-142 gauge film and Mylar® A701-200 gauge film. The release force required to peel, at 180 degrees, a unit width of pressure sensitive tape from coating 17 of Mylar® A701-142 gauge film is about 2.1 lb/inch and from coating 17 of Mylar® A701-200 gauge film is about 2.4 lb/inch.

Because it is common to wind a continuous web of heat-transfer labels into a roll, one advantage to using a non-wax, non-silicone release coating of the type described above in a heat-transfer label construction is that there is no chance of the release coating contaminating the transfer portion of the label with wax or silicone. This may be a substantial benefit as the transfer of a wax or silicone residue onto the transfer portion may adversely affect the adhesive properties of the transfer portion during label transfer.

Another advantage of a non-wax release coating over a wax release coating is that a non-wax release coating is typically capable of being used over a broader range of operating temperatures than is a wax release coating, which typically must be heated to its melting temperature.

Another advantage of a non-silicone release coating over a silicone release coating is that a non-silicone release coating typically has better printability than does a silicone release coating.

Notwithstanding the above, instead of being formed from the non-wax, non-silicone, olefinic substance described above, release coating 17 may comprise a phosphate ester coating, such as RA-150W release coat (Mayzo, Inc., Norcross, Ga.), a carbamate coating, a silicone coating, a fluorocarbon coating or a wax coating, such as a polyethylene-based wax coating of the type described below.

Still other types of coated polymer films which may be used as support portion 13 are described in PCT Application No. PCT/US00/17703, which was published on Jan. 18, 2001, and in European Patent Application No. 819,726, published Jan. 21, 1998, both of which are incorporated herein by reference. Both of the aforementioned patent applications teach a coated film structure preferably comprising:

(i) polymers selected from the group consisting of polyesters such as polyethylene terephthalate and poly(ethylene 2,6-naphthalene dicarboxylate); polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Another example of a suitable support portion 13 may be found in U.S. Pat. No. 6,423,406, which is incorporated herein by reference.

Additives such as coating aids, wetting aids such as surfactants (including silicone surfactants), slip additives, antistatic agents may be incorporated into release coating 17 in levels from 0 to 50% based on the total weight of additive-free coating solids.

The above-described release coating 17 may additionally be applied to the bottom surface of the polymeric carrier 15 for use in preventing the transfer portion from adhering to the underside of carrier 15 when a label assembly comprising a plurality of transfer portions on a single support portion 13 is wound into a roll.

Label 11 additionally comprises a wax layer 19, wax layer 19 being printed onto a desired area of release layer 17 of support portion 13. Wax layer 19, which serves to facilitate the release of the transfer portion to be described below from support portion 13, preferably has a thickness of about 1 to 20 microns, more preferably about 4 to 15 microns, and preferably has a melting point of about 60 to 130° C., more preferably about 80 to 120° C. Wax layer 19 also enhances the color density of the ink design layer of the transfer portion, particularly in the case of light-colored ink design layers used to label dark-colored articles. Wax layer 19 preferably comprises a polyethylene-based wax and may be printed (preferably by screen printing) from a composition comprising 1350 parts Acumist D5 powdered wax (Honeywell, Morristown, N.J.), 450 parts ME 48040 M2 wax emulsion (Michaelman, Cincinnati, Ohio), 300 parts Tafigel PUR 61 thickener (Ultra Additives, Clover, S.C.), 36 parts Dehydran 1620 defoamer (Cognis, Ambler, Pa.), 24 parts of Zonyl FSA wetting agent (DuPont, Wilmington, Del.), and 5400 parts water.

Preferably, the aforementioned formulation is prepared using a Hockmeyer mixer (Hockmeyer Equipment Corporation, Elizabeth City, N.C.) to form a uniform, stable wax slurry, which is storage stable under ambient conditions in a closed container. Screen printing of the formulation may be performed using a 250 mesh screen at a print speed of 2100 imprints per hour. The printed wax layer may be dried and melted by heat from UV and IR lamps of a Smag press (Smag Graphique, Savigny-Sur-Orge Cedex, France). Solidification and crystallization of the wax may be achieved by forced air cooling after exiting the heating zone.

It should be understood that it may not be necessary in all instances to include both release layer 17 and wax layer 19 in label 11 in order to achieve the desired release of the transfer portion from the support portion 13. Therefore, in such instances, one may omit one of layers 17 and 19 from label 11.

Label 11 further comprises a transfer portion 21 (it being understood that, even though only a single transfer portion 21 is shown in FIGS. 1(a) and 1(b), one need not position only one transfer portion 21 per support portion 13, but rather, one may space apart at regular intervals a plurality of identical or different transfer portions 21 on an elongated common web of support portion 13).

Transfer portion 21 comprises a heat transfer or heat-activatable adhesive layer 23 printed directly onto wax layer 19 and an ink design layer 25 printed directly onto adhesive layer 23, ink design layer 25 not exceeding the footprint of adhesive layer 23.

Adhesive layer 23, which may comprise at least one of a polyester adhesive resin, a polyacrylate adhesive resin, a polyurethane adhesive resin, a polyamide adhesive resin and a polyvinyl chloride adhesive resin, preferably has a thickness of about 10 to 200 microns (more preferably about 20 to 80 microns, even more preferably about 20 to 50 microns) and a melting point of polyester resin and polyamide resin in the range of about 60 to 150° C. (more preferably about 80 to 120° C.) and is capable of bonding securely to fabrics. In addition, adhesive layer 23 has a sufficiently smooth top surface to enable the legible printing of ink design layer 25 thereonto. The present inventors have determined that, to obtain a desirably smooth top surface for printing, the surface roughness of adhesive layer 23 preferably should not exceed about 15 microns, more preferably not more than about 10 microns, even more preferably not more than about 5 microns, still even more preferably not more than about 2 microns.

Accordingly, an example of a suitable adhesive composition comprises 450 parts HMP 5184 V polyester powder resin (Bostik-Findley, Middleton, Mass.) as an adhesive, 150 parts PKHW 35 phenoxy dispersion (InChem Corp., Rock Hill, S.C.) as a binder, 110 parts Tafigel PUR 61 thickener (Ultra Additives, Inc., Clover, S.C.), 12 parts Dehydran 1620 defoamer (Cognis Corp., Ambler, Pa.), 6 parts Zonyl FSA wetting agent (DuPont, Wilmington, Del.), and 1800 parts water. Such a polyester-containing adhesive composition results in an adhesive layer having a surface roughness of about 6-10 microns. Another example of a suitable adhesive composition comprises 100 parts Geon 137 PVC resin (PolyOne, Avon Lake, Ohio), 55 parts Santicizer 160 plasticizer (Ferro, Cleveland, Ohio) and 55 parts dioctyl phthalate plasticizer (ChemCentral, Bedford Park, Ill.). Such a PVC-containing adhesive composition has been found to yield an adhesive layer having a surface roughness of less than about 2 microns. If desired, the aforementioned PVC-contained adhesive composition may be modified, such as by cross-linking, to increase its stiffness and to reduce its tackiness. In this manner, different inks may be compatible with adhesive layer 23.

Because the PVC-containing adhesive layer produced by the latter composition yields a smoother top surface than does the polyester-containing adhesive layer produced by the former composition, said PVC-containing adhesive layer is better for printing images and lettering of small size or requiring high resolution. In addition, the above-described PVC-containing adhesive layer appears to be more resistant to cracking, following repeated washing cycles, than the above-described polyester-containing adhesive layer.

Adhesive layer 23 is preferably formed by depositing, by screen printing, gravure printing, flexographic printing or the like, onto wax layer 19 an adhesive composition of the type described above and then evaporating the volatile component (s) of the composition leaving only the non-volatile solid component(s) thereof to form layer 23. Preferably, the deposition of adhesive layer 23 onto wax layer 19 is performed in at least a two pass-through printing process (i.e., the layered printing of two or more adhesive layers of identical composition and approximately equal thickness), as opposed to a single pass-through printing process (i.e., the printing of a single adhesive layer), as the present inventors have found that adhesive layers printed in at least a two pass-through printing process have a smoother, more uniform surface with fewer defects than do adhesive layers printed in a single pass-through printing process.

Ink design layer 25 comprises a first marking 27 and a second marking 29, first marking 27 and second marking 29 being printed adjacent to one another and each directly onto adhesive 23. (Although first marking 27 and second marking 29 are shown and described herein as separate elements on adhesive layer 23, it can readily be appreciated that markings 27 and 29 function together to produce a unitary design on adhesive layer 23. In addition, it should be understood that, although, for ease of illustration, each of markings 27 and 29 is shown in FIGS. 1(a) and 1(b) as a single, continuous element on adhesive layer 23, markings 27 and 29 are not typically in the form of single, continuous elements, but rather, are typically in the form of pluralities of discrete elements making up the desired image and/or text of the label.) First marking 27, which preferably conveys fixed or non-variable label information for a class of articles (e.g., manufacturer trademark, care instructions for articles differing only in size, etc.), is formed by depositing, preferably by screen printing, a suitable ink composition onto one or more desired areas of adhesive layer 23 and, thereafter, allowing any volatile component(s) of the ink composition(s) to evaporate, leaving only the non-volatile ink components to form first marking 27. Preferably, first marking 27 has a thickness of about 0.1 to 30 microns, more preferably about 1 to 20 microns.

In order to maintain the structural integrity of the transferred label, first marking 27 must be compatible with adhesive layer 23. Accordingly, where adhesive layer 23 is a PVC-containing adhesive layer, first marking 27 is preferably formed using a PVC-based ink. An example of a suitable PVC-containing ink composition for use in making first marking 27 comprises 720 parts Geon 137 PVC resin (PolyOne Corporation, Avon Lake, Ohio), 350 parts Santicizer 160 plasticizer (Ferro, Cleveland, Ohio), 350 parts dioctyl phthalate plasticizer (ChemCentral, Bedford Park, Ill.), 140.4 parts Violet PC colorant (Polyone Corporation, Avon Lake, Ohio), 77.4 parts Blue PC colorant (PolyOne Corporation, Avon Lake, Ohio) and 25.2 parts Bright Yellow PC colorant (PolyOne Corporation, Avon Lake, Ohio). As can readily be seen, such an ink composition is very similar in composition to the above-described PVC adhesive composition, and first marking 27 itself bonds to the fabric or other item to which label 11 is applied. Because the above-described PVC-containing ink includes no volatile components, after the ink has been deposited, the printed layer must be heated, typically in an IR or UV oven, to fuse or "cure" the layer.

Second marking 29, which also must be compatible with adhesive layer 23 to maintain the integrity of the transferred label, preferably conveys human-readable information and/or machine-readable information (such as a bar-code) that is specific to a single label or to a subset of labels (i.e., "variable information"), as opposed to the more common or "non-variable" information conveyed by first marking 27. Examples of information that may be included in second marking 29 include: (a) serial numbers uniquely identifying each label; (b) product characteristics, such as the size of each such article of clothing (e.g., S, M, L, etc.), style, fiber type, etc.; (c) pricing information; (d) identification or location of the manufacturer or distributor; and (e) authenticity information.

Preferably, marking 29 is formed using a variable printing technique, i.e., using a direct or indirect thermal transfer printer, ink jet printer, laser jet printer, dye sublimation printer, electrographic printer, magnetographic printer, ionographic printer, digital stencil duplicator, imagesetter, platesetter, direct imaging conventional press, photographic exposure, dry press transfer, hand drawing/coloring or the like, so that a custom label can be created as needed. (Marking 29 may also be made by other printing techniques, such as gravure printing, screen printing, and flexographic printing, but these techniques do not lend themselves as easily to the printing of variable information.) As can readily be appreciated, variable printers of the type described above (e.g., thermal transfer printers, laser printers, inkjet printers, etc.) may be connected to a computer in such a manner that a digital image generated by or selected using the computer may be printed with the printer. Such a computer may be a stand-alone personal computer or may be a computer connected to a network through a mainframe, through the Internet, etc.

In a further embodiment of the invention for variable imprinting of patterns and image elements on a heat transfer adhesive, the printer is adapted to pattern-deposit adhesive in substantially the same configuration as the outline of image elements, but optionally can be slightly larger than the image elements to be imprinted. Various printing technologies are known for pattern deposition of adhesive, including contact methods such as the use of stencil and squeegie and non-contact methods such as jetting. Following pattern deposition of the adhesive, the adhesive optionally may be allowed to dry and an image then imprinted within the outline of the adhesive pattern. Using this method, the patterned adhesive may be deposited in the same imaging process as the printing of variable images, with potential improvements to the quality of the printed images.

As noted above, the legibility of matter printed on adhesive layer 23 is largely a function of the surface roughness of adhesive layer 23, the thickness of the marking printed onto adhesive layer 23, and the chemistry of the ink used to make the printed marking on adhesive layer. Consequently, if the printing surface of adhesive layer 23 has a surface roughness of greater than about 15 microns and if marking 29 is made by a printing technique that produces a relatively thin layer of ink (e.g., thermal transfer printing, ink jet printing, laser jet printing, etc.), the print quality of marking 29 tends to be rather poor. Therefore, the surface roughness of adhesive layer 23 is preferably no greater than about 15 microns, more preferably no greater than about 10 microns, and even more preferably no greater than about 5 microns if one wishes to print graphics (as opposed to text) or text of small lettering using thermal transfer printing or the like. Accordingly, for applications where high resolution is required, the PVC-based adhesive described above is preferably used, said PVC-based adhesive having a surface roughness of no more than about 2 microns. By contrast, where such high resolution is not required, the polyester-based adhesive described above may alternatively be used, said polyester-based adhesive having a surface roughness of about 6-10 microns.

Alternatively viewed, the legibility of marking 29 on adhesive 23 is best where the ink coverage of marking 29 on adhesive layer 23 is high. In particular, where marking 29 is made by thermal transfer printing, the ink coverage of marking 29 on adhesive 23 is preferably at least about 85%, more preferably at least about 90%, even more preferably at least about 98%. It is believed by the present inventors that, when using the above-described PVC-containing adhesive composition to make adhesive layer 23 and when using thermal transfer ribbons, such as, but not limited to, most conventional thermal transfer ribbons, to make marking 29, such ink coverage levels may be achieved.

It should further be noted that, where thermal transfer printing is used to make marking 29, the present inventors have found that certain types of thermal transfer printing ribbons are preferred over other types of thermal transfer printing ribbons, depending upon the printing application. For example, where one wishes to achieve comparatively high image quality, color density and thermal stability in a marking, the present inventors have found that thermal transfer ribbons having a relatively thick ink layer and a resin-based ink formulation are preferred. Consequently, thermal transfer ribbons having an ink layer thickness of about 1-20 microns are preferred, with thermal transfer ribbons having an ink layer thickness of about 1-10 microns being more preferred, and thermal transfer ribbons having an ink layer thickness of about 4-8 microns being even more preferred.

In addition, for applications involving the printing of dark-colored images on light-colored fabrics in which marking 29 is formed using a thermal transfer ribbon, the present inventors have found that thermal transfer ribbons that are wax and resin-based are preferred for producing markings having good color density whereas thermal transfer ribbons that are resin-based are preferred for producing markings that have high resolution and that adhere well to fabric. Therefore, depending upon whether one desires better resolution and fabric adherence or better color density, one can choose an appropriate thermal transfer ribbon for dark-colored images on light-colored fabrics. By contrast, for applications involving the printing of light-colored images on dark-colored fabrics in which marking 29 is formed using a thermal transfer ribbon, the present inventors have found that preferred thermal transfer ribbons are those that are resin-based and, in particular, have a comparatively high concentration of resin. Moreover, such ribbons preferably have an ink layer thickness of at least 4 microns and a color contrast of at least 72%. Examples of suitable thermal transfer ribbons for labeling dark-colored articles with light-colored images include D300 white specialty resin ribbon (Iimak Company, Buffalo, N.Y.).

It is presently envisioned that first marking 27 will typically be applied to adhesive layer 23 by the label manufacturer and that second marking 29 will thereafter be applied by an industrial user of the label (sometimes called a label converter; for example, a clothing manufacturer) just prior to label transfer. In this manner, custom labels may be produced, and the amount of label stock that must be kept on hand by the manufacturer can be significantly decreased. More generally, however, first marking 27 may be imprinted in-line with second marking 29; second marking 29 may be imprinted at the same location but different printing line used to form first marking 27; or first marking 27 and second marking 29 may be imprinted at different locations, typically by different manufacturers.

Where the aforementioned variable printing technique used is thermal transfer printing, said thermal transfer printing is preferably performed using a near-edge head thermal transfer printer or a flat head thermal transfer printer. A near-edge head thermal transfer printer is particularly well-suited for printing information with good visual resolution and at a high printing speed and also is particularly well-suited for printing dark-colored markings on light-colored articles. By contrast, a flat head thermal transfer printer is particularly well-suited for use with resin-based thermal transfer ribbons having thick ink layers and may be used for printing onto stiff and smooth surfaces with high color density and resolution. In addition, a flat head thermal transfer printer is particularly well-suited for printing light-colored markings on dark-colored articles. Examples of suitable thermal transfer printers include computer-controlled thermal transfer printers, such as, but not limited to, Avery Dennison near edge thermal transfer printers (such as Avery Dennison 64-04 near edge thermal transfer printer, Avery Dennison Corporation, Pasadena, Calif.) and Avery Dennison flat head thermal transfer printers (such as Avery Dennison TTX-350 and TTK-300 flat head thermal transfer printers, Avery Dennison Corporation, Pasadena, Calif.).

The aforementioned thermal transfer printing may be performed at room temperature or at another temperature that is selected to optimize printing quality. Similarly, the thermal transfer printing may be performed at a low pressure or at another pressure that is selected to optimize printing quality. It has been found by the present inventors that excellent printing quality can be obtained by using the above-mentioned Avery Dennison 64-04 printer with wax and resin-based ribbons like APR600 thermal transfer ribbon (Armor Company, Nantes Cedex, France) at speeds of about 4-16 ips, with temperature settings (also referred to as "darkness numbers") of 1-110 and pressure settings of 1-3, and with wax and resin-based ribbons like Fujicopian TTM-681B and TTM-679R (Fujicopian Co., Osaka, Japan) at speeds of 4-10 ips, with temperature settings of 30-99 and pressure settings of 1-3. Alternatively, the above-mentioned Avery Dennison 64-04 printer may be used with resin-based ribbons like AXR600 thermal transfer ribbon (Armor Company, Nantes Cedex, France) at speeds of about 4-10 ips.

For the above-mentioned Avery Dennison TTX-350 and TTK-300 flat-head printers, preferred printing speeds are in the range of about 2-5 ips for both wax and resin-based ribbons and resin-based ribbons. Examples of suitable ribbons for use in said flat-head printers include the following Fujicopian resin-based ribbons: FTC-300, TW60, TW61 TW62, TW63, DG-11 dark grey ribbon, DG-12 dark grey ribbon, TW-112 dark grey ribbon, TW-113 dark grey ribbon, TW 114 dark grey ribbon, LG-11 light grey ribbon, LG-12 light grey ribbon, LG-13 light grey ribbon and LG-14 light grey ribbon (Fujicopian Co., Osaka, Japan); Iimak D300 ribbon and Sony TR3370 ribbon (Sony Chemicals Corporation of America, Mt. Pleasant, Pa.). The preferred printing speed for these ribbons is about 4-5 ips, with temperature settings of 50-99 and pressure settings of 1-2.

As noted above, although label 11 is shown in the present embodiment having a single transfer portion 21 positioned on support portion 13, it can readily be appreciated that one may space apart at regular intervals a plurality of identical or different transfer portions 21 on a common support portion 13 to form a label assembly. Such a label assembly is preferably wound into a roll, said roll thereafter being fed into a printer for the printing of markings 29 thereonto. The roll preferably has registration markings at various locations to cue the printer as to where markings 29 should be printed. For example, as in the case of label 11, such registration markings are markings 30-1 and 30-2 printed onto support portion 13 using an IR dye and/or the like. (It should be noted that, although registration markings 30-1 and 30-2 are shown in the present embodiment as printed directly onto support portion 13, registration marks 30-1 and 30-2 could alternatively be printed onto wax layer 19 or onto adhesive layer 23.) As can readily be appreciated, however, if said roll is not wound accurately (i.e., the lateral edges 13-1 and 13-2 of support portion 13 are not aligned, causing the roll to "telescope"), the registration markings may not be read properly by the printer and markings 29 may not be printed in the right locations. Therefore, in accordance with the teachings of the present invention, the roll is preferably wound so that the lateral edges of support portion 13 are aligned to a tolerance of no more than about 0.1-2 mm, more preferably no more than about 0.2-1 mm, even more preferably no more than about 0.2-0.5 mm.

Also, although ink design layer 25 is shown in the present embodiment as a single layer, it should be understood that at least one of first marking 27 and second marking 29 may comprise a plurality of markings successively printed on top of one another.

In addition, it should be understood that one or more of adhesive layer 23, first marking 27 and second marking 29 could include one or more security materials for product security, such as counterfeit detection. Such security materials may comprise security inks and/or security additives that are added to or included in a single component of the label (such as a marking or adhesive layer) or multiple components of the label so as to interact to provide a security indication. Readily apparent (or "overt") security indicators are generally preferred to covert security.

Security inks include, but are not limited to, IR-activatable inks, UV-activatable inks, visible light-activatable inks, heat-activatable inks, electrically-activatable inks, magnetically-activatable inks, chemically-activatable inks, humidity-activatable inks, pressure-activatable inks, dichroic inks, time-controlled inks.

Security additives include, for example, microscopic tracer particles (or "taggants") that may be incorporated into, e.g., the adhesive layer of the heat-transfer label. Certain molecules can be coded by their physical material composition, color, alpha-numeric characters and other methods. An electronic reader would be used to verify the molecular composition in the heat-transfer label.

Figure 2A:
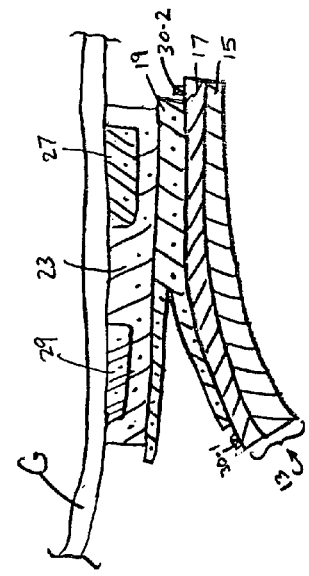
FIGS. 2(a) and 2(b) are schematic section views showing how the heat-transfer label of FIGS. 1(a) and 1(b) may be used to label a fabric garment.
Figure 2B:
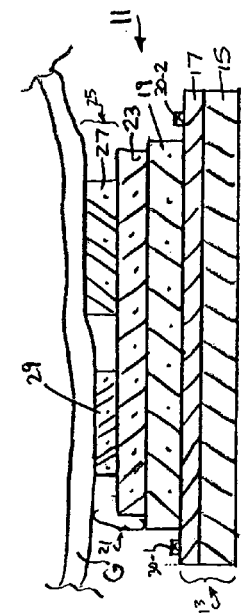

Referring now to FIGS. 2(a) and 2(b), there is shown the manner in which label 11 may be used to label an article, such as a garment G. Garment G may be made of one or more fabrics, such fabrics being formed from natural or synthetic materials (e.g., cotton, nylon, polyester, rayon, Lycra, Spandex or combinations thereof); alternatively, garment G may be made of non-fabric materials, such as leather or the like. As seen in FIG. 2(a), one first places label 11 against garment G, with ink layer 25 of transfer portion 21 directly contacting garment G and carrier 15 of support portion 13 facing away from garment G. To bond transfer portion 21 to garment G, label 11 is pressed firmly against garment G while heat is applied up through support portion 13 to ink layer 25 and adhesive layer 23 until ink layer 25 and adhesive layer 23 bond to garment G. Preferably, the aforementioned application of heat and pressure to label 11 is effected using a heat-transfer bonding machine at a bonding temperature of about 200° F.-500° F., more preferably about 300° F.-450° F., even more preferably about 350° F.-400° F., at a bonding pressure of about 20-100 psi, more preferably about 50-80 psi, even more preferably about 60 psi, for a bonding time of about 1-10 seconds, more preferably about 2-6 seconds, even more preferably about 2-3 seconds. (Where label 11 is being used to label dark-colored articles and marking 29 has been formed using thermal transfer ribbons like FTC-300 resin-based ribbon (Fujicopian Co., Osaka, Japan) and Sony TR3370 resin-based ribbon (Sony Chemicals Corporation of America, Mt. Pleasant, Pa.), it has been found that the color of the image on the labeled article is brightest when the bonding temperature is about 350° F.-365° F. and fades when the bonding temperature exceeds 400° F. and the bonding time exceeds 2 seconds.) Suitable bonding machines include, but are not limited to, Avery Dennison Heat Transfer Bonder Model Nos. HT-2000 and M79200-00-3 (Avery Dennison Corporation, Pasadena, Calif.) and Hastings heat transfer bonder model no. US3-HT (Hastings Manufacturing Inc., St. Louis, Mo.). For example, one may use an Avery Dennison Heat Transfer Bonder Model No. M79200-00-3 set at 40-60 psi at 400° F. for 2 seconds. As seen in FIG. 2(b), with transfer portion 21 thus bonded to garment G, support portion 13 is then peeled away, leaving only transfer portion 21 (and, possibly, a portion of wax layer 19) on garment G.

One can adjust the type of finish transfer portion 21 exhibits on the labeled article either by peeling support portion 13 from transfer portion 21 immediately after transfer ("hot release") to yield a matte finish or by peeling support portion 13 from transfer portion 21 after a short cooling period following transfer to yield a glossy finish.

The present inventors have noted that, when label 11 is used to decorate fabric articles, a good degree of label adherence and abrasion resistance can be achieved. For example, once applied to fabric, transfer portion 21 can endure (i) numerous (e.g., at least 50) washing cycles without breaking down significantly or losing image quality (e.g., becoming faded or distorted), (ii) stretching three times with its associated fabric to equal to or more than about 70% beyond its original size without becoming damaged, and (iii) crockrubbing for at least 500 cycles in a dry or wet state without becoming damaged. In addition, label 11 results in transfer portion 21 forming a smooth surface on the labeled article, without any puckering on the article, and results in a "soft-feeling" label to the touch. Furthermore, label 11 does not leave a visually discernible residue on the fabric, thereby affording a "no-label-look" to the labeled article.

Moreover, one of the advantages associated with labels 11, as compared to existing heat-transfer labels for fabric, is that support portion 13 can be peeled away from transfer portion 21 soon (i.e., within a few seconds or less) after transfer portion 21 has been applied to fabric under conditions of heat and pressure.

Referring now to FIG. 3, there is shown a schematic section view of a second embodiment of a heat-transfer label constructed according to the teachings of the present invention, said heat-transfer label being represented generally by reference numeral 111.

Heat-transfer label 111 is similar in many respects to heat-transfer label 11, the principal difference between the two labels being that first marking 27 and second marking 29 of label 11 are replaced with marking 125 in heat-transfer label 111. (It should be understood that, even though only a single transfer portion 121 is shown in FIG. 3, one need not position only one transfer portion 121 per support portion 13, but rather, one may space apart at regular intervals a plurality of identical or different transfer portions 121 on an elongated common web of support portion 13. It should also be understood that, although, for ease of illustration, marking 125 is shown in FIG. 3 as a single, continuous element on adhesive layer 23, marking 125 is not typically in the form of a single, continuous element, but rather, is typically in the form of a plurality of discrete elements making up the desired image and/or text of the label.) Marking 125, which is formed using the same types of variable printing techniques that may be used to make marking 29, preferably depicts both the common or non-variable information typically depicted in marking 27 and the variable information typically depicted in marking 29. As can readily be appreciated, making 125 may also be used to make entirely customizable or unique markings for each label produced.

One advantage to incorporating all of the ink design in marking 125, as opposed to having some of the ink design in marking 27 and the remainder of the ink design in marking 29 is that the thickness of marking 125 is typically less than that of marking 27. This reduction in thickness of the ink design layer results in the transfer portion of the label being less perceptible to a wearer of a labeled garment, thereby making the labeled garment more comfortable to the wearer.

Where marking 125 is printed using a thermal transfer printing ribbon, it should be understood that, instead of printing adhesive layer 23 onto wax layer 19 and then printing marking 125 onto adhesive layer 23, one could incorporate adhesive layer 23 into the thermal transfer printing ribbon used to make marking 125 and, thereby, simultaneously print adhesive layer 23 and marking 125. Furthermore, one could additionally incorporate wax layer 19 into the thermal transfer ribbon used to make marking 125 and adhesive layer 23.

It should also be understood that one or both of adhesive layer 23 and second marking 125 could include one or more security materials of the type described above.

Label 111 may be applied to an article in the same fashion as label 11.

Referring now to FIG. 4, there is shown a schematic section view of a third embodiment of a heat-transfer label constructed according to the teachings of the present invention, said heat-transfer label being represented generally by reference numeral 211.

Heat-transfer label 211 is similar in most respects to label 11, the principal difference between the two labels being that second marking 29 of label 11 is replaced with a second marking 229 in label 211.

Second marking 229 comprises a first barrier layer 231 positioned directly on top of adhesive layer 23, an ink layer 233 positioned directly on top of first barrier layer 231, and a second barrier layer 235 positioned directly on top of ink layer 233. First barrier layer 231 serves to limit diffusion, during label transfer, of ink layer 233 into adhesive layer 23, and second barrier layer 235 serves to limit diffusion, during label transfer, of ink layer 233 into the garment or other article being labeled. By thus limiting the diffusion of ink layer 233, barrier layers 231 and 235 curtail the loss of resolution and color density of ink layer 233. (Such a curtailment is particularly desirable where ink layer 233 involves a light-colored ink used to label a dark-colored article.) Examples of materials suitable for use as barrier layers 231 and 235 include silicon-based oxide or nitride coatings, titanium oxide coatings, and resin-based adhesive coatings, all such coatings preferably having a thickness of about 0.1-10 microns, more preferably about 0.2-2 microns.

Figure 5:
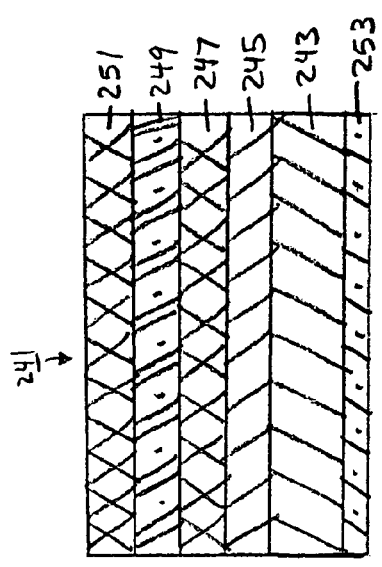
FIG. 5 is a schematic section view of one embodiment of a thermal transfer ribbon suitable for use in making the variable information marking shown in FIG. 4.

Ink layer 233 may be identical in composition to the ink used to form marking 29 and preferably is made by thermal transfer printing using a suitable thermal transfer ribbon. First barrier layer 231, ink layer 233, and second barrier layer 235 may be printed separately (for example, using different thermal transfer ribbons and a multi-head thermal transfer printer) or may be printed together onto adhesive layer 23 using a single thermal transfer ribbon including all three layers of material. An example of such a thermal transfer ribbon is shown in FIG. 5 and is represented generally as ribbon 241. Ribbon 241 includes a carrier 243 that is preferably in the form of a polymeric film, a wax release layer 245 deposited directly onto carrier 243, a barrier layer 247 deposited directly onto wax release layer 245, an ink layer 249 deposited directly onto barrier layer 247, and a barrier layer 251 deposited directly onto ink layer 249. In addition, a lubricating coating 253 is deposited directly onto the bottom of carrier 243 to prevent barrier layer 251 from adhering to the bottom of carrier 243 when ribbon is wound into a roll.

When making a marking 229 on adhesive layer 23 of label 211 using ribbon 241, barrier layer 251 is placed in direct contact with adhesive layer 23 and a portion thereof is used to form first barrier layer 231, with corresponding portions of ink layer 249 and barrier layer 247 simultaneously separating from wax release layer 245 and carrier 243 to become ink layer 233 and second barrier layer 235, respectively, of marking 229.

It should be understood that one could modify label 211 by omitting either barrier layer 231 or barrier layer 235 from marking 229. (The omission of both barrier layers 231 and 235 would result in a label similar to label 111.) The omission of barrier layer 231 or barrier layer 235 may be done, for example, by omitting barrier layer 251 or barrier layer 247, respectively, from ribbon 241. An example of a thermal transfer ribbon like ribbon 241 in which barrier layer 251 has been omitted is commercially available as Sony TR 4042 thermal transfer ribbon.

Figure 5A:
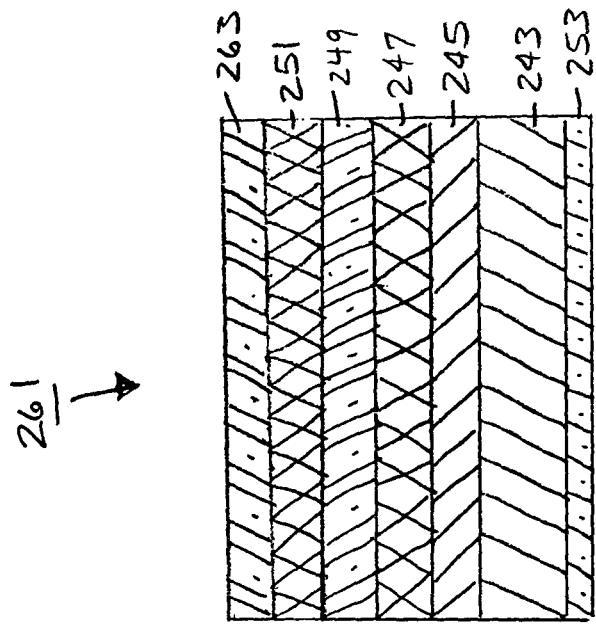
FIG. 5(a) is a schematic section view of an alternative embodiment to the thermal transfer ribbon of FIG. 5.

It should also be understood that label 211 could be modified to omit entirely first marking 27, with the information of first marking 27 being incorporated into second marking 229. Where first marking 27 is thus omitted and marking 229 is printed using a thermal transfer printing ribbon, one could incorporate adhesive layer 23 into the thermal transfer printing ribbon used to make marking 229 and simultaneously print adhesive layer 23 and marking 229. An example of such a thermal transfer ribbon that includes an adhesive layer is shown in FIG. 5(a), said ribbon being represented generally by reference numeral 261. Ribbon 261 is identical to ribbon 241, except for the inclusion of an adhesive layer 263 over barrier layer 251, adhesive layer 263 being identical in composition and thickness to adhesive layer 23.

It should further be understood that one or more of adhesive layer 23, first marking 27 and second marking 229 could include one or more security materials of the type described above.

Label 211 may be applied to an article in the same fashion as label 11.

Figure 6:
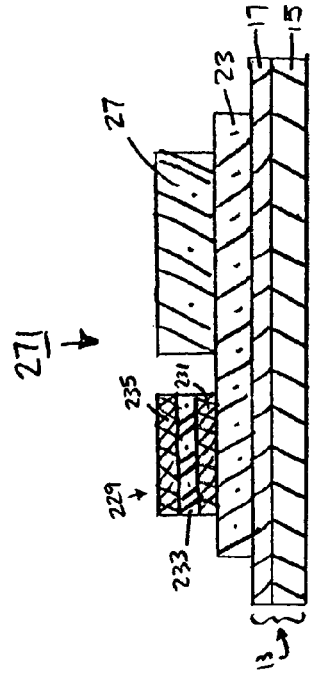
FIG. 6 is a schematic section view of a fourth embodiment of a heat-transfer label well-suited for use in labeling articles of fabric.

Referring now to FIG. 6, there is shown a schematic section view of a fourth embodiment of a heat-transfer label constructed according to the teachings of the present invention, said heat-transfer label being represented generally by reference numeral 271.

Heat-transfer label 271 is very similar to heat-transfer label 211, the only difference between the two labels being that label 271 does not include a layer corresponding to wax layer 19 of label 211.

It should be understood that label 271 could be modified to omit entirely first marking 27, with the information of first marking 27 being incorporated into second marking 229. Where first marking 27 is thus omitted and marking 229 is printed using a thermal transfer printing ribbon, one could incorporate adhesive layer 23 into the thermal transfer printing ribbon used to make marking 229 and simultaneously print adhesive layer 23 and marking 229.

It should also be understood that label 271 could be modified to omit one or both of barrier layers 231 and 235 from marking 229.

It should further be understood that one or more of adhesive layer 23, first marking 27 and second marking 229 could include one or more security materials of the type described above.

Heat-transfer label 271 may be applied to an article in the same fashion as label 11.

Figure 7:
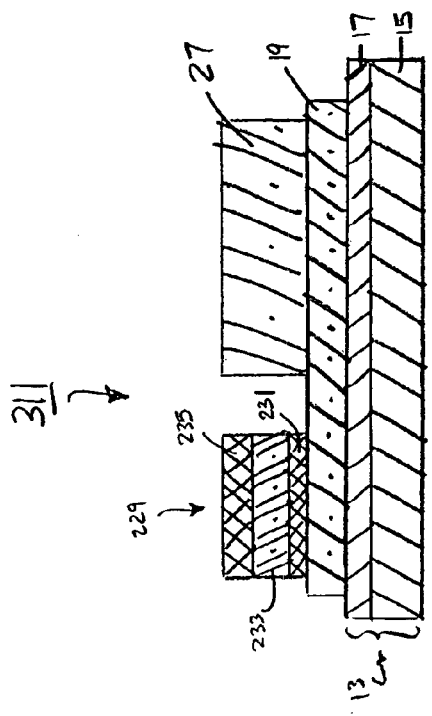
FIG. 7 is a schematic section view of a fifth embodiment of a heat-transfer label well-suited for use in labeling articles of fabric.

Referring now to FIG. 7, there is shown a schematic section view of a fifth embodiment of a heat-transfer label constructed according to the teachings of the present invention, said heat-transfer label being represented generally by reference numeral 311.

Heat-transfer label 311 is very similar to heat-transfer label 211, the only difference between the two labels being that label 311 does not include a layer corresponding to adhesive layer 23 of label 211.

It should be understood that label 311 could be modified to omit entirely first marking 27, with the information of first marking 27 being incorporated into second marking 229.

It should also be understood that label 311 could be modified to omit one or both of barrier layers 231 and 235 from marking 229.

It should further be understood that one or both of first marking 27 and second marking 229 could include one or more security materials of the type described above.

Label 311 may be applied to an article in the same manner as label 211. One advantage of label 311 over label 211 is that label 311 does not include an adhesive layer. As a result, the manufacturing process for producing label 311 is less involved than that for producing label 211, thereby resulting in a reduction of materials needed and in manufacturing time and expense. In addition, because label 311 does not include an adhesive layer, its transfer portion has a reduced thickness or bulk as compared to that of label 211, making the transfer portion of label 311 less irritating to the skin of a wearer of a labeled garment.

On the other hand, the lack of an adhesive layer in label 311 below markings 27 and 229 tends to cause the ink of markings 27 and 229 to diffuse during label transfer. (Such diffusion is even greater for marking 229 in the event that barrier layer 231 is also omitted.) As a result, the resolution of the image transferred by label 311 tends to be poorer than that transferred by label 211. Consequently, label 311 is not as well suited as label 211 for printing images or lettering of small size.

Also, as can readily be appreciated, the lack of an adhesive layer in label 311 typically renders the transferred label less resistant to washing or to otherwise being removed from its associated article. This is undesirable where one wishes to form a lasting image on the article but may be desirable if one wishes to form only a temporary image on the article.

Figure 8:
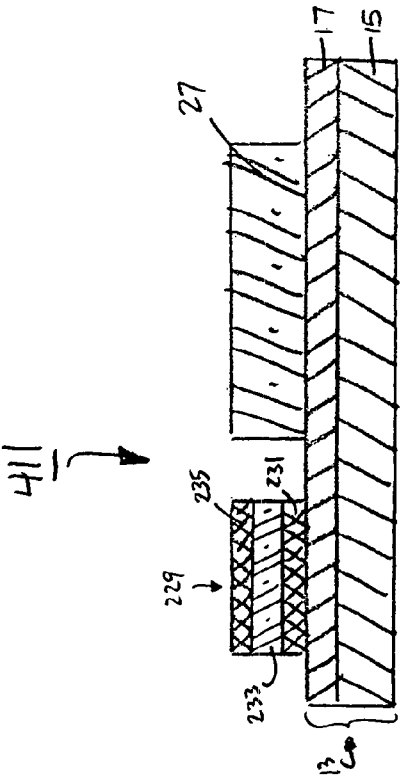
FIG. 8 is a schematic section view of a sixth embodiment of a heat-transfer label well-suited for use in labeling articles of fabric.

Referring now to FIG. 8, there is shown a schematic section view of a sixth embodiment of a heat-transfer label well-suited for use in labeling articles of fabric, said heat-transfer label being constructed according to the teachings of the present invention and being represented generally by reference numeral 411.

Heat-transfer label 411 is very similar to heat-transfer label 311, the only difference between the two labels being that label 411 does not include a layer corresponding to wax layer 19 of label 311. As can readily be appreciated, because label 311 does not include an adhesive layer or a wax layer, markings 27 and 229 must be inherently capable of adhering to some degree to the article to which they are applied. (This is also true to a large extent for markings 27 and 229 of label 311, whose adherence is assisted only by wax layer 19.)

It should be understood that label 411 could be modified to omit entirely first marking 27, with the information of first marking 27 being incorporated into second marking 229.

It should also be understood that label 411 could be modified to omit one or both of barrier layers 231 and 235 from marking 229.

It should further be understood that one or both of first marking 27 and second marking 229 could include one or more security materials of the type described above.

Label 411 may be applied to an article in the same manner as label 311.

Figure 9:
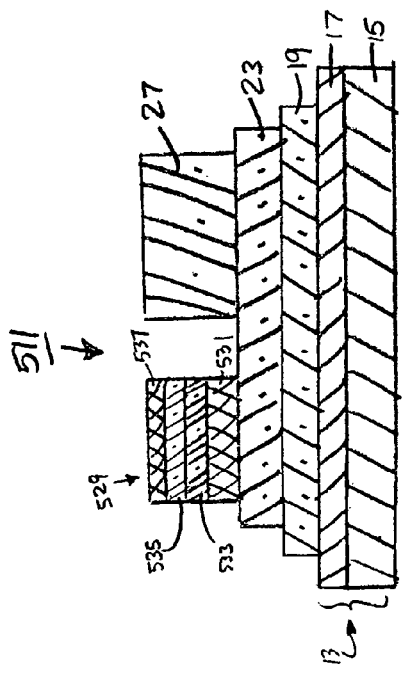
FIG. 9 is a schematic section view of a seventh embodiment of a heat-transfer label well-suited for use in labeling articles of fabric.

Referring now to FIG. 9, there is shown a schematic section view of a seventh embodiment of a heat-transfer label well-suited for use in labeling articles of fabric, said heat-transfer label being constructed according to the teachings of the present invention and being represented generally by reference numeral 511.

Heat-transfer label 511 is similar in most respects to label 211, the principal difference between the two labels being that second marking 229 of label 211 is replaced with a second marking 529 in label 511.

Second marking 529 comprises a first barrier layer 531 positioned directly on top of adhesive layer 23, a first ink layer 533 positioned directly on top of first barrier layer 531, a second ink layer 535 positioned directly on top of first ink layer 533, and a second barrier layer 537 positioned directly on top of second ink layer 535. First barrier layer 531 and second barrier layer 537 are identical in composition to and serve the same function as first barrier layer 231 and second barrier layer 235, respectively. First ink layer 533 and/or second ink layer 535 may be identical in composition to and serve a similar function as ink layer 233 of marking 229. (Although each of first ink layer 533 and second ink layer 535 is shown in FIG. 9 as a single, continuous element of a given surface area, each of first and second ink layers 533 and 535 may be made up of a plurality of discrete elements, with portions of second ink layer 535 positioned over open areas of first ink layer 533 and vice versa.) As a first alternative, first ink layer 533 may be made from an ink of a first color and second ink layer 535 may be made from an ink of a second color so that a multi-colored or blended-color ink design may be produced. As a second alternative, at least one of first ink layer 533 and second ink layer 535 may be made from a UV or IR ink so that said at least one ink layer is capable of functioning as a security element. (It should also be noted that, in addition to ink layers 533 and 535, one or more other ink layers may be added to marking 529 so that marking 529 includes three or more ink layers.)

Figure 10:
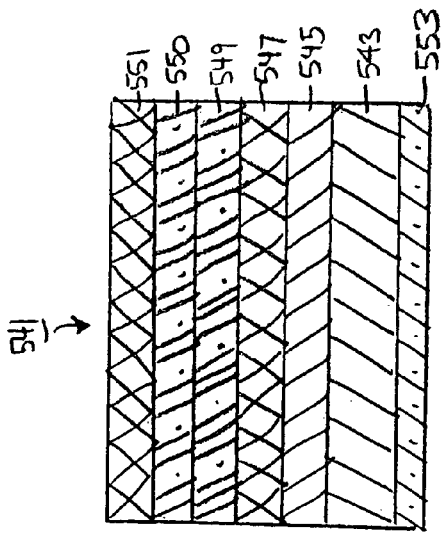
FIG. 10 is a schematic section view of one embodiment of a thermal transfer ribbon suitable for use in making the variable information marking shown in FIG. 9.

Each of first barrier layer 531, first ink layer 533, second ink layer 535 and second barrier layer 537 may be printed separately, for example, by thermal transfer printing using suitable thermal transfer ribbons and a multi-head thermal transfer printer. More preferably, first barrier layer 531, first ink layer 533, second ink layer 535, and second barrier layer 537 are printed together onto adhesive layer 23 using a single thermal transfer ribbon including all four layers of material. An example of such a thermal transfer ribbon is shown in FIG. 10 and is represented generally as ribbon 541. Ribbon 541 includes a carrier 543 that is preferably in the form of a polymeric film, a wax release layer 545 deposited directly onto carrier 543, a barrier layer 547 deposited directly onto wax release layer 545, a first ink layer 549 deposited directly onto barrier layer 547, a second ink layer 550 deposited directly onto first ink layer 549, and a barrier layer 551 deposited directly onto second ink layer 550. (First ink layer 549 may include, for example, an ink that is transparent or colorless under normal light conditions and that emits light when irradiated with UV or IR light, and second ink layer 550 may include, for example, an ink that appears colored under normal light conditions.) In addition, a lubricating coating 553 is deposited directly onto the bottom of carrier 543 to prevent barrier layer 551 from adhering to the bottom of carrier 543 when ribbon is wound into a roll.

When making a marking 529 on adhesive layer 23 of label 511 using ribbon 541, barrier layer 551 is placed in direct contact with adhesive layer 23 and a portion thereof is used to form first barrier layer 531, with corresponding portions of ink layer 550, ink layer 549 and barrier layer 547 simultaneously separating from wax release layer 545 and carrier 543 to become first ink layer 533, second ink layer 535, and second barrier layer 537, respectively, of marking 529.

It should be understood that one could modify label 511 by omitting one or both of barrier layers 531 and 537 from marking 529 and/or by omitting one or both of adhesive layer 23 and wax layer 19.

It should also be understood that label 511 could alternatively or additionally be modified by omitting entirely first marking 27, with the information of first marking 27 being incorporated into second marking 529. Where first marking 27 is thus omitted and marking 529 is printed using a thermal transfer printing ribbon, one could incorporate adhesive layer 23 into the thermal transfer printing ribbon used to make marking 529 and simultaneously print adhesive layer 23 and marking 529.

It should further be understood that, independently of marking 529, one or both of adhesive layer 23 and first marking 27 could include one or more security materials of the type described above.

Label 511 may be applied to an article in the same fashion as label 11.

Figure 11:
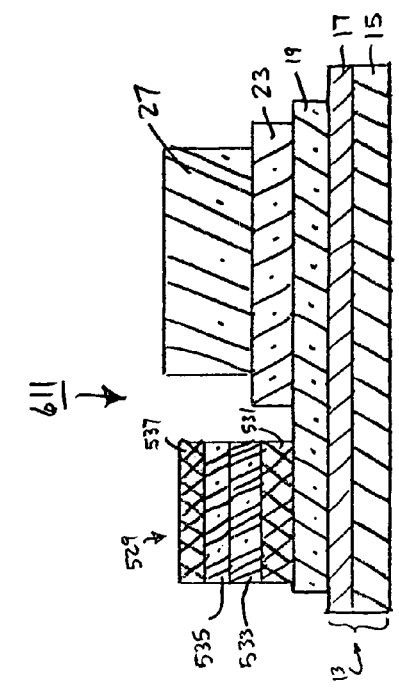
FIG. 11 is a schematic section view of an eighth embodiment of a heat-transfer label well-suited for use in labeling articles of fabric.

Referring now to FIG. 11, there is shown a schematic section view of an eighth embodiment of a heat-transfer label well-suited for use in labeling articles of fabric, said heat-transfer label being constructed according to the teachings of the present invention and being represented generally by reference numeral 611.

Label 611 is similar in many respects to label 511, the principal difference between the two labels being that, in label 611, marking 529 is printed directly onto wax layer 19 whereas, in label 511, marking 529 is printed directly onto adhesive layer 23. Because marking 529 of label 611 is printed directly onto wax layer 19, instead of being printed onto adhesive layer 23, marking 529 of label 611 typically does not adhere as well to the article being labeled as does marking 27 of label 611. However, this may be desirable, for example, where the article being labeled is a garment and one wishes to have some information (e.g., price information) be removable from the garment upon washing of the garment and other information (e.g., permanent care instructions) not be removable from the garment upon washing of the garment.

It should be understood that one could modify label 611 by omitting one or both of barrier layers 531 and 537 from marking 529 and/or by omitting ink layer 533 or ink layer 535 from marking 529.

It should further be understood that, independently of marking 529, one or both of adhesive layer 23 and first marking 27 could include one or more security materials of the type described above.

Label 611 may be applied to an article in the same fashion as label 11.

Figure 12:
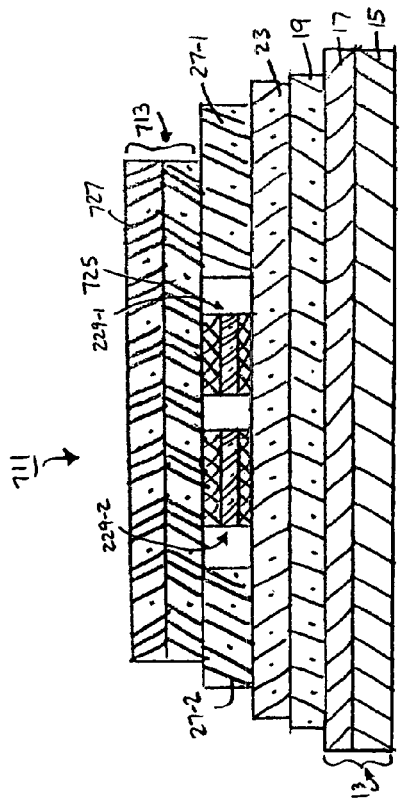
FIG. 12 is a schematic section view of a ninth embodiment of a heat-transfer label well-suited for use in labeling articles of fabric.

Referring now to FIG. 12, there is shown a schematic section view of a ninth embodiment of a heat-transfer label well-suited for use in labeling articles of fabric, said heat-transfer label being constructed according to the teachings of the present invention and being represented generally by reference numeral 711.

Label 711 is similar in many respects to label 211, the two labels differing in that, whereas the ink design layer of label 211 includes one first marking 27 and one second marking 229, the ink design of label 711 includes (i) a pair of first markings 27-1 and 27-2 printed on adhesive layer 23, markings 27-1 and 27-2 of label 711 being identical in composition to marking 27 of label 211, (ii) a pair of second markings 229-1 and 229-2 printed on adhesive layer 23, second markings 229-1 and 229-2 being identical in composition to second marking 229, and (iii) a third marking 713 printed over markings 27-1 and 27-2 and markings 229-1 and 229-2, third marking 713 including a first ink layer 725 and a second ink layer 727. Preferably, third marking 713 is made by a variable printing technique, such as by thermal transfer printing. Where thermal transfer printing is used, first and second ink layers 725 and 727 may be printed simultaneously from a single thermal transfer ribbon or may be printed separately from separate thermal transfer ribbons that may be installed in a multi-head thermal transfer printer.

Label 711 may be applied to an article in the same fashion as label 11.

Referring now to FIG. 13, there is shown a schematic section view of a tenth embodiment of a heat-transfer label well-suited for use in labeling articles of fabric, said heat-transfer label being constructed according to the teachings of the present invention and being represented generally by reference numeral 811.

Heat-transfer label 811 comprises a support portion 813, support portion 813 comprising a carrier 815 and a release layer 817. Carrier 815 is identical to carrier 15 of label 11, and release layer 817 is identical to release layer 17 of label 11.

Heat-transfer label 811 also comprises a wax layer 819 printed over release layer 817, wax layer 819 being identical to wax layer 19 of label 11.

It should be understood that it may not be necessary in all instances to include both release layer 817 and wax layer 819 in label 811 in order to achieve the desired release of the transfer portion from the support portion 813. Therefore, in such instances, one may omit one of layers 817 and 819 from label 811.

Heat-transfer label 811 further comprises a transfer portion 821 (it being understood that, even though only a single transfer portion 821 is shown in FIG. 13, one need not position only one transfer portion 821 per support portion 813, but rather, one may space apart at regular intervals a plurality of identical or different transfer portions 821 on an elongated common web of support portion 813). Transfer portion 821 preferably includes (i) a first marking 825 printed directly onto a desired area of wax layer 819, (ii) a primer layer 826 printed directly onto first marking 825 (as well as onto any exposed areas of wax layer 819 within first marking 825) and onto a surrounding area of wax layer 819, (iii) a heat-activatable adhesive layer 827 printed directly onto primer layer 826 and a surrounding area of wax layer 819; and (iv) a second marking 828 printed directly onto adhesive layer 827.

First marking 825 of transfer portion 821 may actually comprise either a single ink layer or a plurality of ink layers. Preferably, first marking 825, which preferably has a thickness of about 0.1 to 30 microns, more preferably about 1 to 20 microns, is formed in the conventional manner by depositing, preferably by screen printing, gravure printing or flexographic printing, one or more ink compositions of the type described below onto one or more desired areas of wax layer 819 and, thereafter, allowing the ink composition to dry or curing the ink composition to form marking 825. Preferably, first marking 825 comprises a polyvinyl chloride (PVC) resin that has been cross-linked using at least one cross-linker, said at least one cross-linker preferably having more than one functional group per molecule, said functional group being at least one of isocyanate, aziridine, carbodiimide, alkoxymethyl and methylol. (Without wishing to be limited to any particular theory as to how the invention operates, the present inventors believe that the cross-linking of the PVC resin in marking 825 impedes the diffusion of ink within marking 825 during heat transfer.) An example of a suitable ink composition for use in making marking 825 comprises 144 parts Geon 137 PVC resin (Polyone Corporation, Avon Lake, Ohio), 80 parts CYMEL 303 hexamethoxymethyl melamine crosslinker (Cytec Corp., West Paterson, N.J.), 54 parts Santicizer 160 benzyl butyl phthalate plasticizer (Ferro, Cleveland, Ohio), 54 parts dioctyl phthalate plasticizer (ChemCentral, Bedford Park, Ill.), 25.2 parts CYCAT 296-9 catalyst (Cytec Corp., West Paterson, N.J.), 20.08 parts Violet PC colorant (Polyone Corporation, Avon Lake, Ohio), 15.48 parts Blue PC colorant (PolyOne Corporation, Avon Lake, Ohio) and 5.04 parts Bright Yellow PC colorant (PolyOne Corporation, Avon Lake, Ohio).

As can readily be appreciated, depending upon the particular use to which label 811 is put, first marking 825 may be used, for example, to convey non-variable information of the type conveyed by marking 27 of label 11.

Primer layer 826, which provides some structural support to first marking 825 as adhesive layer 827 softens during heat transfer (and, in so doing, impedes distortion of the design of first marking 825), may comprise either a single primer layer or a plurality of primer layers. Preferably, primer layer 826 comprises a cross-linker and at least one of the following polymers: one or more polyurethane polymers, one or more phenoxy polymers, and one or more polyvinyl chloride polymers. Said cross-linker preferably has more than one functional group per molecule, said functional group being at least one of isocyanate, aziridine, carbodiimide, alkoxymethyl and methylol. An example of a preferred primer composition comprises 100 parts Geon 137 PVC resin (PolyOne Corporation, Avon Lake, Ohio), 55 parts Santicizer 160 plasticizer (Ferro, Cleveland, Ohio), 55 parts dioctyl phthalate plasticizer (ChemCentral, Bedford Park, Ill.), and 10.5 parts NB 80 adhesion promoter (Nazdar, Shawnee, Kans.).

Primer layer 826, which preferably has a thickness of about 0.1 to 50 microns, more preferably about 1 to 20 microns, is formed in the conventional manner by depositing, preferably by screen printing, gravure printing or flexographic printing, the primer composition of the type described above onto first marking 825, the exposed areas of wax layer 819 within first marking 825, and an area of wax layer 819 surrounding first marking 825 and, thereafter, allowing the volatile component(s) of the primer composition(s) to evaporate, leaving only the non-volatile primer components to form layer 826.

Adhesive layer 827, which may comprise at least one of a polyester adhesive resin, a polyamide adhesive resin, a polyacrylate adhesive resin, a polyurethane adhesive resin, and a polyvinyl chloride adhesive resin, preferably has a thickness of about 10 to 200 microns (more preferably about 20 to 80 microns, even more preferably about 20 to 50 microns), a melting point of polyester resin and polyamide resin that is in the range of about 60 to 150° C. (more preferably about 80 to 120° C.) and is capable of bonding securely to fabrics. In addition, adhesive layer 827 has a sufficiently smooth top surface to enable the legible printing of second marking 828 thereonto. As noted above, the present inventors have determined that, to obtain a desirably smooth top surface for printing, the surface roughness of adhesive layer 827 preferably should not exceed about 10 microns, more preferably not more than about 5 microns, even more preferably not more than about 2 microns.

An example of an adhesive composition suitable for use in forming adhesive layer 827 comprises 450 parts HMP 5184 V polyester powder resin (Bostik-Findley, Middleton, Mass.) as an adhesive, 150 parts PKHW 35 phenoxy dispersion (InChem Corp., Rock Hill, S.C.) as a binder, 10 parts Tafigel PUR 61 thickener (Ultra Additives, Inc., Clover, S.C.), 12 parts Dehydran 1620 defoamer (Cognis Corp., Ambler, Pa.), 6 parts Zonyl FSA wetting agent (DuPont, Wilmington, Del.), and 1800 parts water. Such a polyester-containing adhesive composition results in an adhesive layer having a surface roughness of about 6-10 microns. Another example of a suitable adhesive composition comprises 100 parts Geon 137 PVC resin (PolyOne, Avon Lake, Ohio), 55 parts Santicizer 160 plasticizer (Ferro, Cleveland, Ohio) and 55 parts dioctyl phthalate plasticizer (ChemCentral, Bedford Park, Ill.). Such a PVC-containing adhesive composition has been found to yield an adhesive layer having a surface roughness of less than 1 micron. If desired, the aforementioned PVC-contained adhesive composition may be modified, such as by cross-linking, to increase its stiffness and to reduce its tackiness. In this manner, different inks may be compatible with adhesive layer 827.

Adhesive layer 827 is preferably formed by depositing, by screen printing or the like, onto primer 826 and a surrounding area of wax layer 819 an adhesive composition of the type described above and then evaporating the volatile component(s) of the composition leaving only the non-volatile solid component(s) thereof to form layer 827. Preferably, the deposition of adhesive layer 827 is performed in at least a two pass-through printing process.

Second marking 828, which is printed onto adhesive layer 827, is preferably used to convey variable information. Accordingly, second marking 828 is preferably formed by a variable printing technique, such as thermal transfer printing, laser printing, ink jet printing, bubble jet printing, etc. In the present embodiment, second marking 828 is identical to marking 529 and includes a first barrier layer 831, a first ink layer 833, a second ink layer 835 and a second barrier layer 837.

It should be understood that one could modify label 811 by omitting one or both of barrier layers 831 and 837 from marking 828 and/or by omitting one of first ink layer 833 or second ink layer 835 from marking 828.

It should also be understood that label 811 could alternatively or additionally be modified by omitting entirely first marking 825, with the information of first marking 825 being incorporated into second marking 828.

It should further be understood that, independently of second marking 828, one or all of adhesive layer 827, primer layer 826 and first marking 825 could include one or more security materials of the type described above.

Furthermore, although second marking 828 is shown in FIG. 13 as being aligned with an open area of first marking 825, one could align second marking 828 with a portion or all of first marking 825, for example, to form an authenticity certificate or the like.

Label 811 may be applied to an article in the same fashion as label 11.

Figure 14:
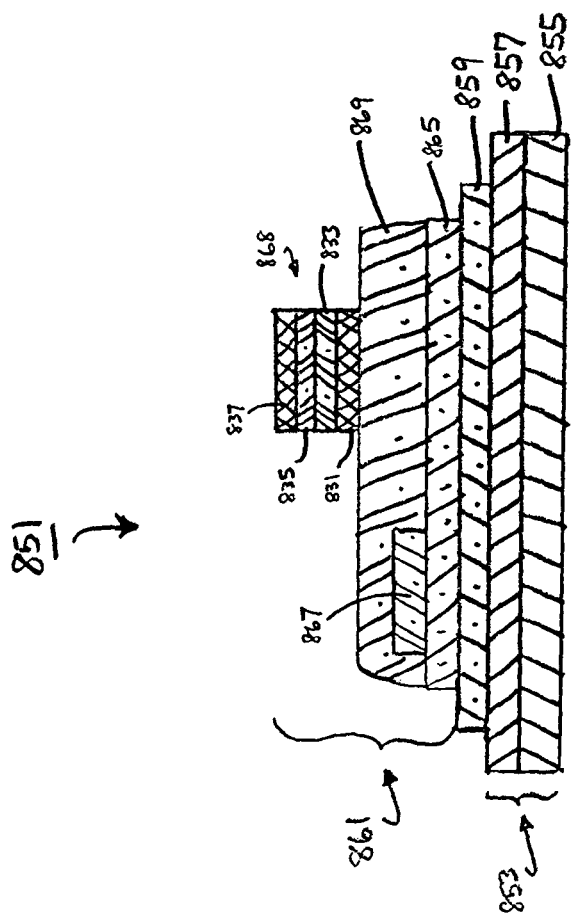
FIG. 14 is a schematic section view of an eleventh embodiment of a heat-transfer label well-suited for use in labeling articles of fabric.

Referring now to FIG. 14, there is shown a schematic section view of an eleventh embodiment of a heat-transfer label well-suited for use in labeling articles of fabric, said heat-transfer label being constructed according to the teachings of the present invention and being represented generally by reference numeral 851.

Heat-transfer label 851 comprises a support portion 853, support portion 853 comprising a carrier 855 and a release layer 857. Carrier 855 is identical to carrier 15 of label 11, and release layer 857 is identical to release layer 17 of label 11. Heat-transfer label 851 also comprises a wax layer 859 printed onto release layer 857, wax layer 859 being identical to wax layer 19 of label 11.

It should be understood that it may not be necessary in all instances to include both release layer 857 and wax layer 859 in label 851 in order to achieve the desired release of the transfer portion from the support portion 853. Therefore, in such instances, one may omit one of layers 857 and 859 from label 851.

Heat-transfer label 851 further comprises a transfer portion 861 (it being understood that, even though only a single transfer portion 861 is shown in FIG. 14, one need not position only one transfer portion 861 per support portion 853, but rather, one may space apart at regular intervals a plurality of identical or different transfer portions 861 on an elongated common web of support portion 853). Transfer portion 861 preferably includes (i) a first heat-activatable adhesive layer 865 printed directly onto a desired area of wax layer 859, (ii) a first marking 867 printed onto first heat-activable adhesive layer 865, (iii) a second heat-activatable adhesive layer 869 printed directly onto first marking 867 and onto any exposed areas of first heat-activatable adhesive layer 865; and (iv) a second marking 868 printed directly onto adhesive layer 869.

First heat-activatable adhesive layer 865 and second heat-activatable adhesive layer 869 must be compatible with one another and may be, but need not be, identical to one another. Each of adhesive layers 865 and 867 may be identical in composition to adhesive layer 23 of label 11.

First marking 867 may be identical to marking 825 of label 811, and second marking 868 may be identical to marking 828 of label 811.

Label 851 may be applied to an article in the same fashion as label 11.

Figure 15:
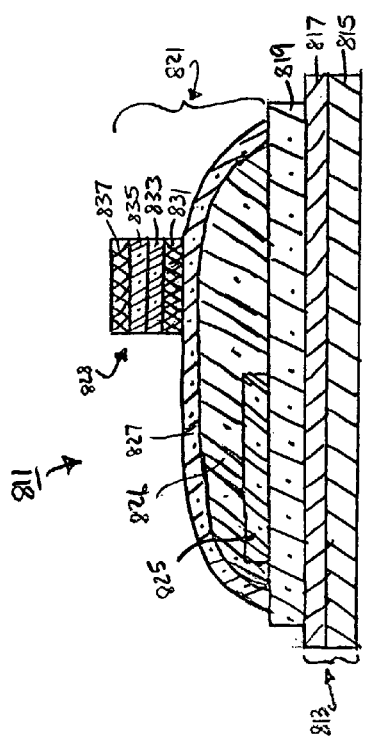
FIG. 15 is a schematic section view of a twelfth embodiment of a heat-transfer label well-suited for use in labeling articles of fabric.

Referring now to FIG. 15, there is shown a schematic section view of a twelfth embodiment of a heat-transfer label well-suited for use in labeling articles of fabric, said heat-transfer label being constructed according to the teachings of the present invention and being represented generally by reference numeral 911.

Heat-transfer label 911 comprises a support portion 913, support portion 913 comprising a carrier 915 and a release layer 917. Carrier 915 is identical to carrier 15 of label 11, and release layer 917 is identical to release layer 17 of label 11. Heat-transfer label 911 also comprises a wax layer 919 overcoating release layer 917, wax layer 919 being identical to wax layer 19 of label 11.

It should be understood that it may not be necessary in all instances to include both release layer 917 and wax layer 919 in label 911 in order to achieve the desired release of the transfer portion from the support portion 913. Therefore, in such instances, one may omit one of layers 917 and 919 from label 911.

Heat-transfer label 911 further comprises a transfer portion 921 (it being understood that, even though only a single transfer portion 921 is shown in FIG. 15, one need not position only one transfer portion 921 per support portion 913, but rather, one may space apart at regular intervals a plurality of identical or different transfer portions 921 on an elongated common web of support portion 913). Transfer portion 921 preferably includes (i) a protective lacquer layer 923 printed directly on top of a desired area of wax layer 919, (ii) a first marking 925 printed directly onto a desired area of lacquer layer 923, (iii) a primer layer 926 printed directly onto first marking 925, any exposed areas of protective lacquer layer 923 (except where specified below), and a surrounding area of wax layer 919, and (iv) a heat-activatable adhesive layer 927 printed directly onto primer layer 926 (except where specified below) and a surrounding area of wax layer 919.

Protective lacquer layer 923, which preferably has a thickness of about 0.1 mil, may be formed from a wide variety of different resins, both water-based and solvent-based, provided that the resultant layer 923 possesses an acceptable degree of abrasion resistance for a fabric article. A preferred formulation from which protective lacquer layer 923 may be printed includes a combination of a high $T_g$ solvent-based phenoxy resin, such as PKHH phenoxy resin (In Chem Corp., Rock Hill, S.C.), and a low $T_g$ solvent-based polyurethane resin, such as Estane 5715 polyurethane resin (Noveon, Inc., Cleveland, Ohio), such resins preferably being combined in a 1 to 3 ratio with an organic solvent, such as cyclohexanone and/or a dibasic ester (e.g., dimethyl adipate). In addition, an adhesion promoter, such as NB 80 polymeric aliphatic isocyanate adhesion promoter (Nazdar Ink, Shawnee, Kans.), is preferably included in the formulation to enhance printing quality, said adhesion promoter being present in an amount constituting about 0 to 10%, by weight, more preferably 2 to 8%, by weight. A small amount (less than 1%) of a surfactant, e.g., Zonyl FSO fluorosurfactant (DuPont, Wilmington, Del.), may also be added to the formulation prior to printing.

The aforementioned combination of a low $T_g$ polyurethane polymer and a high $T_g$ phenoxy polymer is particularly desirable as it results in a medium $T_g$ mixture that provides a "soft" feeling with the right polymer modulus that prevents the label construction from blocking when the label construction is manufactured as a self-wound roll.

Another preferred formulation from which protective lacquer layer 923 may be printed includes 100 parts Nazdar 9627 clear overprint varnish (Nazdar Ink, Shawnee, Kans.) and 5 parts NB 80 adhesion promoter.

Other suitable protective lacquer layers 923 may be found in the following patents, all of which are incorporated herein by reference: U.S. Pat. Nos. 5,800,656; 6,033,763; 6,083,620; and 6,099,944.

To form protective lacquer layer 923, a lacquer dispersion or solution of the type described above is deposited onto a desired area of wax layer 919, preferably by screen printing, gravure printing, flexographic printing or a similar technique. (Considerations relevant in deciding whether to use screen printing, gravure printing or flexographic printing to print a given layer, such as lacquer layer 923, include the particle size of the composition to be printed and the thickness of the layer one wishes to print. Screen printing is most suitable for compositions having a larger particle size (i.e., as great as about 100-200 microns) and where a thicker layer is desired (i.e., about 5-200 microns). Gravure printing is most suitable for compositions having a smaller particle size (i.e., no more than a micron or two) and where a thinner layer is desired (i.e., about 1-2 microns). Flexographic printing is suitable for compositions having a particle size of no more than several microns and where a thin layer of about 1-10 microns is desired.)

After deposition of the lacquer composition onto the desired area of layer 919, the volatile component(s) of the composition evaporate(s), leaving only the non-volatile components thereof to make up lacquer layer 923.

First marking 925 of transfer portion 921, which layer may actually comprise either a single ink layer or a plurality of ink layers, may be formed from one or more of a wide variety of different inks provided that the resultant marking 925 possesses an acceptable degree of adhesion to both protective lacquer layer 923 and primer layer 926. For example, where protective lacquer layer 923 comprises a water-based resin, one may use a water-based ink, such as the Nazdar 2700 series of Aquasafe Gloss P.O.P. water-based screen inks (Nazdar, Shawnee, Kans.). By contrast, where protective lacquer layer 923 comprises a solvent-based resin, one may use a solvent-based ink, such as the Nazdar 9600 series of polyester inks. (Where the Nazdar 9600 series of polyester inks are used, such inks may be thinned, prior to printing, with about 5-10% of a thinner, such as Nazdar 9630 thinner.) Preferably, an adhesion promoter, such as NB 80 adhesion promoter, is included in the ink formulation to enhance printing quality, said adhesion promoter being present in an amount constituting about 0 to 10%, by weight, more preferably 2 to 8%, by weight. An example of a preferred ink formulation comprises 100 parts Nazdar 96PB22 blue ink and 5 parts NB 80 adhesion promoter.

First marking 925, which preferably has a thickness of about 0.2 mil, is formed in the conventional manner by depositing, preferably by screen printing, one or more ink compositions of the type described above onto one or more desired areas of lacquer layer 923 and, thereafter, allowing the volatile component(s) of the ink composition(s) to evaporate, leaving only the non-volatile ink components to form first marking 925.

It should be understood that, although, for ease of illustration, first marking 925 is shown in FIG. 15 as a continuous layer on lacquer layer 923, first marking 925 is typically not in the form of a continuous layer, but rather, is typically in the form of a plurality of discrete elements making up the desired image and/or text of the label.

As can readily be appreciated, depending upon the particular use to which label 911 is put, first marking 925 may be used, for example, to convey non-variable information of the type conveyed by marking 27 of label 11.

Primer layer 926, which promotes adhesion between first marking 925 and adhesive layer 927, is preferably identical in composition to protective layer 923 and may actually comprise either a single primer layer or a plurality of primer layers. Preferably, primer layer 926 has a thickness of about 0.2-0.5 mil.

Where the presence of both protective lacquer layer 923 and primer layer 926 are not needed to maintain the structural integrity and cohesiveness of transfer portion 921, either protective lacquer layer 923 or primer 926 may be omitted.

Adhesive layer 927, which preferably has a thickness of about 4-5 mil, comprises one or more heat-activatable resins, such as polyester, polyamide, polyurethane and PVC resins, and is capable of securely binding to fabric. One example of a suitable adhesive composition for use in forming adhesive layer 927 comprises about 30 g of 5184p polyester powder adhesive (Bostik-Findley, Middleton, Mass.), about 60 g water, about 10 g PKHW 35 water-based phenoxy dispersion (InChem Corp., Rock Hill, S.C.) as a binder, about 1 g of Dehydran 1620 defoamer (Cognis Corp., Ambler, Pa.) and about 2-3 g of Tafigel PUR 61 thickener (Ultra Additives, Inc., Clover, S.C.). Preferably, the aforementioned polyester powder adhesive has a particle size of no more than about 80μ, more preferably no more than about 38-40 g, in order to facilitate the screen printing of the adhesive formulation. (If the particle size of the polyester powder adhesive is too big, it may be difficult to screen print the adhesive formulation.)

Another adhesive composition differs from the foregoing composition in that 10 g Sancure 1601 polyurethane dispersion (Noveon Inc. Cleveland, Ohio) is used instead of the PKHW 35 water-based phenoxy binder; however, the former composition is much preferred over the latter as the latter tends to cause a yellow discoloration in the label after repeated washing cycles. It is believed that such a discoloration is caused by an adverse reaction between the polyurethane binder and the laundering conditions or environment.

Adhesive layer 927 is preferably formed by depositing, by screen printing or the like, onto (i) primer 926 or any exposed portions of lacquer layer 923 and first marking 925 (except as specified below) and (ii) a surrounding area of release coating 917 an adhesive composition of the type described above and then evaporating the volatile component(s) of the composition leaving only the non-volatile solid component(s) thereof to form layer 927.

Transfer portion 921 further includes a second marking 931, second marking being deposited directly onto protective lacquer layer 923 within a transverse window 932 extending through adhesive layer 927, primer layer 926 and first marking 925. Second marking 931, which is identical in construction to second marking 828 of label 811, includes a first barrier layer 933, a first ink layer 935, a second ink layer 937 and a second barrier layer 939.

Second marking 931 is preferably used to convey variable information. Accordingly, second marking 931 is preferably formed by a variable printing technique, such as thermal transfer printing, laser printing, ink jet printing, bubble jet printing, etc.

It should be understood that one could modify label 911 by omitting one or both of barrier layers 931 and 937 from marking 931 and/or by omitting one of first ink layer 933 or second ink layer 935 from marking 931.

It should also be understood that label 911 could alternatively or additionally be modified by omitting entirely first marking 925, with the information of first marking 925 being incorporated into second marking 931.

It should further be understood that, independently of second marking 931, one or all of protective lacquer layer 923, first marking 925, primer layer 926 and adhesive layer 927 could include one or more security materials of the type described above.

Label 911 may be applied to an article in the same fashion as label 11.

The following examples are provided for illustrative purposes only and are in no way intended to limit the scope of the present invention:

Example 1

The surface roughness of the exposed adhesive of each of (i) a UNIMARK-brand 3D Flexistretch heat transfer paper with heat transfer for fabric labeling (Matsui International Company, Inc., Gardena, Calif.); (ii) a POLYMARK-brand Polystretch heat transfer paper with heat transfer for fabric labeling (Illinois Tool Works, Glenview, Ill.); and (iii) Sample Nos. 1 and 2 (a pair of labels like label 11 of the present invention wherein adhesive layer 23 was made from the above-described PVC-containing adhesive composition) was investigated in the manner hereinafter described.

The label samples were laid flat on a glass slide with a double-sided tape. Using Dektak 8 stylus profiler (Veeco Instruments, Woodbury, N.Y.), random scans were performed on three different locations of each label over a length of 2000 um of the requested areas. The average roughness, Ra, was generated over a length of 1800 um, with 100 um cut off from both the starting point and the endpoint. The scan parameters were programmed as follows: scan length=2000 um; duration=13 seconds; sample=3900 points; resolution=0.513 um/sample; stylus force=10 mg; measurements range=655 KA; tower speed=high; stitching=off; profile=hills and valleys; sampling=automatic.

The results of the above measurements are as shown in TABLE I.

TABLE I

| Label Type | $R_a$ (um) | Average/Standard Dev. |
| --- | --- | --- |
| UNIMARK-brand | 17.2; 16.7; 11.0 | 15.0/3.4 |
| POLYMARK-brand | 21.9; 22.3; 21.6 | 21.9/0.4 |
| Sample No. 1 | 2.0; 1.9; 2.1 | 2.0/0.1 |
| Sample No. 2 | 1.9; 2.0; 2.2 | 2.0/0.2 |

As can be seen above, the two labels of the present invention had a much smoother adhesive surface than did the POLYMARK-brand label and the UNIMARK-brand label, with the POLYMARK-brand label having a surface roughness of about 21.9 um, the UNIMARK-brand label having a surface roughness of about 15 um and the two labels of the present invention having a surface roughness of about 2.0 um.

Example 2

The ink coverage achieved when a thermal transfer marking was printed onto the exposed adhesive of each of (i) a UNIMARK-brand 3D Flexistretch heat transfer paper with heat transfer for fabric labeling (Matsui International Company, Inc., Gardena, Calif.); (ii) a POLYMARK-brand Polystretch heat transfer paper with heat transfer for fabric labeling (Illinois Tool Works, Glenview, Ill.); and (iii) Sample Nos. 3 and 4 (a pair of labels like label 11 of the present invention wherein adhesive layer 23 was made from the above-described PVC-containing adhesive composition) was investigated in the manner hereinafter described.

Markings were made on an exposed area of the adhesive surface of each of the aforementioned labels using an APR600 wax and resin-based thermal ribbon (Armor, Nantes Cedex, France), installed in an Avery 64-04 near-edge head printer run at 6 ips, at a temperature setting of 99 and a pressure setting of 3.

The printed surface of each label was then imaged using an Olympus BX60 optical microscope. Pictures of each surface were taken at 10× objective with reflection light source. A polarizing filter was used to obtain the best color contrast of the ink. The pictures generated were then processed for ink coverage using Image-Pro software version 3.0 (Media Cybernetics, Inc., Silver Spring, Md.). An intensity value was manually selected for each picture to define the ink covered areas from the entire image. Depending on the exposure conditions, the contrast of the white objects from dark background or of the dark objects from white background was manually defined to obtain the threshold intensity value. Once the threshold intensity was chosen, the software performed an automatic count to measure the ink coverage value of the binary black and white image. The Image-Pro software parameter of PerArea (ratio of area covered by ink to total area of image) was employed for this measurement. The PerArea values are reported herein as % ink coverage.

The results of the above measurements are as shown in TABLE II.

| Label Type | % Ink Coverage |
| --- | --- |
| UNIMARK-brand | ~65% |
| POLYMARK-brand | ~12% |
| Sample No. 3 | ~98% |
| Sample No. 4 | ~98% |

As can be seen above, the two labels of the present invention had a much better ink coverage than did the POLYMARK-brand label and the UNIMARK-brand label, with the POLYMARK-brand label having an ink coverage of about 65%, the UNIMARK-brand label having an ink coverage of about 12% and the two labels of the present invention having an ink coverage of about 98%.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:
1. A heat-transfer label for labeling an article of fabric, the heat-transfer label comprising:
   (a) a support portion wherein the support portion includes a carrier and a release coating positioned directly on top of the carrier; and

(b) a transfer portion, the transfer portion being positioned over the support portion for transfer of the transfer portion from the support portion to an article of fabric, the transfer portion comprising
  (i) a first printed marking;
  (ii) a second printed marking, wherein the first printed marking is a screen printed marking consisting of a polyvinyl chloride ink and the second printed marking is a thermal transfer marking comprising a layer made with a wax and resin-based thermal transfer ribbon, and
  (iii) a heat-activatable adhesive layer, the heat-activatable adhesive layer having a top surface, the top surface having a surface roughness not exceeding about 10 microns;
  (iv) wherein the first printed marking and the second printed marking are positioned over the top surface of the heat-activatable adhesive layer and positioned next to one another and wherein a portion of the top surface of the heat-activatable adhesive layer is uncovered, said portion of the top surface of the heat-activatable adhesive layer being free to be directly contacted with the article of fabric; and
  (v) a wax layer over the release coating, the heat-activatable adhesive layer being in direct contact with the wax layer.

2. The heat-transfer label as claimed in claim 1 wherein the second printed marking is printed directly onto the heat-activatable adhesive layer.

3. The heat-transfer label as claimed in claim 2, wherein the first printed marking is printed directly onto the heat-activatable adhesive layer.

4. The heat-transfer label as claimed in claim 1 wherein the first printed marking has a thickness of about 1-20 microns.

5. The heat-transfer label as claimed in claim 1 wherein the second printed marking comprises a first ink layer and a first ink diffusion barrier layer, the first ink layer being positioned over the first ink diffusion barrier layer, each of the first ink layer and the first ink diffusion barrier layer being positioned over the support portion.

6. The heat-transfer label as claimed in claim 5 wherein the first ink diffusion barrier layer has a thickness of about 0.1 to 10 microns and is selected from the group consisting of silicon-based oxide coatings, silicon-based nitride coatings, titanium oxide coatings, and resin-based adhesive coatings.

7. The heat-transfer label as claimed in claim 5 wherein the second printed marking further comprises a second ink layer, the second ink layer being positioned over the first ink layer.

8. The heat-transfer label as claimed in claim 5 wherein the second printed marking further comprises a second ink diffusion barrier layer, the second ink diffusion barrier layer being positioned over the second ink layer.

9. The heat-transfer label as claimed in claim 1 wherein the second printed marking comprises at least a first ink layer and a second ink layer, one of the first ink layer and the second ink layer being positioned over the other, at least one of the first ink layer and the second ink layer comprising a UV- or IR-activatable ink.

10. The heat-transfer label as claimed in claim 1 wherein the second printed marking comprises a first ink layer and a second ink layer, the first ink layer being made from an ink of a first color and the second ink layer being made from an ink of a second color.

11. The heat-transfer label as claimed in claim 1 wherein the heat-activatable adhesive layer comprises a polyvinyl chloride resin.

12. The heat-transfer label as claimed in claim 1 wherein the release coating is made of a non-wax, non-silicone, release material.

13. The heat-transfer label as claimed in claim 1 wherein at least one of the first printed marking and the heat-activatable adhesive layer includes at least one of a security ink and a security additive.

14. The heat-transfer label as claimed in claim 1 wherein the heat-activatable adhesive layer has a surface roughness of no more than about 5 microns.

15. The heat-transfer label as claimed in claim 14 wherein the heat-activatable adhesive layer has a surface roughness of no more than about 2 microns.

16. The heat-transfer label as claimed in claim 1 wherein the heat-activatable adhesive layer is prepared by at least a two pass-through printing process.

17. The heat-transfer label as claimed in claim 1 wherein the first printed marking is uncovered, the first printed marking being free to be directly contacted with the article of fabric.

18. The heat-transfer label as claimed in claim 1 wherein said heat-activatable adhesive layer has a thickness of about 20-80 microns.

19. The heat-transfer label as claimed in claim 18 wherein said first printed marking has a thickness of about 1-20 microns.

20. The heat-transfer label as claimed in claim 1 wherein said heat-activatable adhesive layer has a thickness of about 20-50 microns.

21. The heat-transfer label as claimed in claim 20 wherein said first printed marking has a thickness of about 1-20 microns.

22. The heat-transfer label as claimed in claim 1 wherein said heat-activatable adhesive layer has a thickness of about 20-200 microns.

23. The heat-transfer label as claimed in claim 1 wherein the thermal transfer marking comprises a first ink layer and a first ink diffusion barrier layer, said first ink layer being positioned over said first ink diffusion barrier layer.

24. The heat-transfer label as claimed in claim 23 wherein each of the first and second printed markings is printed directly onto the heat-activatable adhesive layer.

* * * * *